US012762883B2

(12) United States Patent
Stremmel et al.

(10) Patent No.: US 12,762,883 B2
(45) Date of Patent: Oct. 13, 2026

(54) SELECTIVE INPUT DATA GENERATION FOR MACHINE LEARNING MODELS

(71) Applicant: Optum, Inc., Minnetonka, MN (US)

(72) Inventors: Joel David Stremmel, Iowa City, IA (US); Sanjit Singh Batra, Redwood City, CA (US); Jun Han, Union City, NJ (US)

(73) Assignee: Optum, Inc., Minnetonka, MN (US)

( * ) Notice: Subject to any disclaimer, the term of this patent is extended or adjusted under 35 U.S.C. 154(b) by 219 days.

(21) Appl. No.: 18/768,128

(22) Filed: Jul. 10, 2024

(65) Prior Publication Data

US 2026/0017973 A1 Jan. 15, 2026

(51) Int. Cl.
*G06V 30/416* (2022.01)
*G06V 30/19* (2022.01)

(52) U.S. Cl.
CPC ...... *G06V 30/416* (2022.01); *G06V 30/19093* (2022.01); *G06V 30/19127* (2022.01); *G06V 30/1918* (2022.01)

(58) Field of Classification Search
CPC ........... G06V 30/416; G06V 30/19093; G06V 30/19127; G06V 30/1918
USPC .......................................................... 382/155
See application file for complete search history.

(56) References Cited

U.S. PATENT DOCUMENTS

| | | | | |
|---|---|---|---|---|
| 9,147,041 | B2 | 9/2015 | Amarasingham et al. | |
| 10,395,772 | B1 | 8/2019 | Lucas et al. | |
| 11,087,088 | B2 | 8/2021 | Chatterjee et al. | |
| 11,314,790 | B2 | 4/2022 | Chang et al. | |
| 11,791,048 | B2 | 10/2023 | Pang et al. | |
| 11,983,486 | B1 * | 5/2024 | Mariko | G06N 3/0475 |
| 12,032,921 | B2 | 7/2024 | Peleg et al. | |
| 12,579,179 | B2 * | 3/2026 | Yang | G06F 16/355 |

(Continued)

FOREIGN PATENT DOCUMENTS

| | | | |
|---|---|---|---|
| CN | 113420151 | A | 9/2021 |
| CN | 113535694 | A | 10/2021 |

(Continued)

OTHER PUBLICATIONS

"Good Machine Learning Practice for Medical Device Development: Guiding Principles," U.S. Food & Drug Administration, Oct. 27, 2021, (2 pages), [Retrieved from the Internet Feb. 7, 2023] <URL: https://www.fda.gov/medical-devices/software-medical-device-samd/good-machine-learning-practice-medical-device-development-guiding-principles>.

(Continued)

*Primary Examiner* — Ali Bayat
(74) *Attorney, Agent, or Firm* — Alston & Bird LLP

(57) ABSTRACT

Various embodiments of the present disclosure provide a text interpretation technique. The text interpretation technique includes generating a plurality of text segment embeddings from a plurality of input text documents and identifying prompt embeddings associated with a predictive task. The technique includes generating task-specific similarity scores for the plurality of text segments based on a comparison between the plurality of text segment embeddings and the prompt embeddings, The technique includes identifying a set of task-specific text segments from the plurality of text segments based on the plurality of task-specific similarity scores and training a target machine learning model based on the set of task-specific text segments.

20 Claims, 8 Drawing Sheets

(56) References Cited

U.S. PATENT DOCUMENTS

| | | | | |
|---|---|---|---|---|
| 2020/0097713 | A1 | 3/2020 | Cramer et al. | |
| 2020/0184016 | A1 | 6/2020 | Roller | |
| 2020/0193153 | A1 | 6/2020 | Lee et al. | |
| 2020/0279105 | A1 | 9/2020 | Muffat et al. | |
| 2020/0411147 | A1 | 12/2020 | Kapit et al. | |
| 2021/0216762 | A1 | 7/2021 | Brooks et al. | |
| 2021/0224306 | A1 | 7/2021 | Choudhary et al. | |
| 2022/0005463 | A1 | 1/2022 | Bender et al. | |
| 2022/0067307 | A1* | 3/2022 | Rei | G06N 3/084 |
| 2022/0083898 | A1 | 3/2022 | Shukla et al. | |
| 2022/0114494 | A1 | 4/2022 | Saleiro et al. | |
| 2022/0129791 | A1 | 4/2022 | Nia et al. | |
| 2022/0351868 | A1 | 11/2022 | Godbole et al. | |
| 2023/0222285 | A1 | 7/2023 | Zhang et al. | |
| 2023/0334887 | A1* | 10/2023 | Stremmel | G06F 40/30 |
| 2024/0211504 | A1* | 6/2024 | Jeong | G06N 3/045 |
| 2024/0320422 | A1 | 9/2024 | Peleg et al. | |
| 2025/0258708 | A1* | 8/2025 | Crabtree | G06F 9/5027 |
| 2025/0259082 | A1* | 8/2025 | Crabtree | G06N 3/042 |

FOREIGN PATENT DOCUMENTS

| | | | |
|---|---|---|---|
| CN | 112418409 | B | 8/2023 |
| EP | 3365800 | A4 | 2/2019 |
| WO | 2024/042164 | A2 | 2/2024 |

OTHER PUBLICATIONS

"Integrated Gradients," TensorFlow Core, Dec. 15, 2022, (25 pages), (online), [Retrieved from the Internet Feb. 7, 2022] <URL: https://www.tensorflow.org/tutorials/interpretability/integrated_gradients>.

Ahmed, Nizar et al. "Classification of Biomedical Texts for Cardiovascular Diseases With Deep Neural Network Using a Weighted Feature Representation Method," Healthcare, vol. 8, No. 4, pp. 1-15, Oct. 10, 2020, DOI: http://dx.doi.org/10.3390/healthcare8040392.

Arras, Leila et al. "Explaining Predictions of Non-Linear Classifiers in NLP," arXiv PrePrint arXiv: 1606.07298v1 [cs.CL] Jun. 23, 2016 (7 pages), DOI: https://arxiv.org/pdf/1606.07298.pdf.

Cai, Weihong et al. "Multi-Layer Contextual Passage Term Embedding for Ad-Hoc Retrieval," Information, vol. 13, No. 5, pp. 1-16, Apr. 25, 2022, DOI: http://dx.doi.org/10.3390/info13050221.

Chalkidis, et al., "An Exploration of Hierarchical Attention Transformers for Efficient Long Document Classification", available online at https://arxiv.org/pdf/2210.05529, Oct. 11, 2022, (16 pages).

Dong, Qian et al. "Disentangled Graph Recurrent Network for Document Ranking," Data Science and Engineering, vol. 7, No. 1, pp. 30-43, Feb. 15, 2022, DOI: https://doi.org/10.1007/s41019-022-00179-3.

Huang, et al., "PLM-ICD: Automatic ICD Coding with Pretrained Language Models", Jul. 12, 2022, (12 pages), arXiv:2207.05289v1.

Ji, Shaoxiong et al. "Does the Magic of BERT Apply to Medical Code Assignment? A Quantitative Study," Computers in Biology and Medicine, vol. 139:104998, Oct. 26, 2021, pp. 1-7, available online: https://doi.org/10.1016/j.compbiomed.2021.104998.

Jin, Xisen et al. "Towards Hierarchical Importance Attribution: Explaining Compositional Semantics for Neural Sequence Models," arXiv PrePrint arXiv:1911.06194v1 [cs.CL] Nov. 8, 2019, (12 pages), available online at https://arxiv.org/pdf/1911.06194v1.pdf.

Kim, et al., "Feature Attribution Analysis to Quantify the Impact of Oceanographic and Maneuverability Factors on Vessel Shaft Power Using Explainable Tree-Based Model", Sensors, vol. 23, Jan. 17, 2023, (21 pages), DOI: 10.3390/s23031072.

Kokalj, Enja et al. "BERT Meets Shapley: Extending SHAP Explanations to Transformer-Based Classifiers," In Proceedings of the EACL Hackashop on News Media Content Analysis and Automated Report Generation, Apr. 2021, pp. 16-21, available online at https://aclanthology.org/2021.hackashop-1.3.pdf.

Lundberg, Scott. "SHAP: A Game Theoretic Approach to Explain the Output of Any Machine Learning Model," Github, Jun. 15, 2022, (8 pages), [Retrieved from the Internet Feb. 7, 2023] <URL: https://github.com/slundberg/shap>.

Mahbub, Maria et al. "Unstructured Clinical Notes Within the 24 Hours Since Admission Predict Short, Mid & Long-Term Mortality in Adult ICU Patients," PLoS One, vol. 17, No. 1:e0262182, pp. 1-23, Jan. 6, 2022, DOI: https://doi.org/10.1371/journal.pone.0262182.

Mehta, Vivek et al. "WEClustering: Word Embeddings Based Text Clustering Technique for Large Datasets," Complext & Intelligent Systems, vol. 7, pp. 3211-3224, DOI: https://doi.org/10.1007/s40747-021-00512-9.

Pierse, Charles. "Transformers Interpret," Oct. 17, 2022, (3 pages), (online), [Retrieved from the Internet Feb. 7, 2023] <URL: https://github.com/cdpierse/transformers-interpret#sequence-classification-explainer>.

Rasmy, et al., "Med-BERT: Pretrained Contextualized Embeddings on Largescale Structured Electronic Health Records for Disease Prediction", Digital Medicine vol. 4, No. 86, May 20, 2021, (13 pages), DOI: 10.1038/s41746-021-00455-y.

Skrlj, Blaz, et al. "Exploring Neural Language Models via Analysis of Local and Global Self-Attention Spaces," In Proceedings of the EACL Hackashop on News Media Content Analysis and Automated Report Generation, Apr. 19, 2021, pp. 76-83, available online at https://aclanthology.org/2021.hackashop-1.11.pdf.

Sood, et al., "Feature Importance Explanations for Temporal Black-Box Models", available online at https://arxiv.org/pdf/2102.11934.pdf, Feb. 23, 2021, (13 pages).

Sun, Xu et al. "Feature-Frequency-Adaptive On-Line Training for Fast and Accurate Natural Language Processing," Computational Linguistics, vol. 40, No. 3, pp. 563-586, Sep. 1, 2014, DOI: 10.1162/COLL_a_00193.

Sundararajan, Mukund et al. "Axiomatic Attribution for Deep Networks," In Proceedings of the 34th International Conference on Machine Learning, PMLR, vol. 70, pp. 3319-3328, (Year: 2017). PMLR. https://arxiv.org/pdf/1703.01365.

Yin, Kayo et al. "Interpreting Language Models With Contrastive Explanations," arXiv preprint arXiv:2202.10419. https://arxiv.org/pdf/2202.10419v1 [cs.CL] Feb. 21, 2022, (13 pages), available online at https://arxiv.org/pdf/2202.10419v1.pdf.

Zhang, Sheng et al. "Locally Aggregated Feature Attribution on Natural Language Model Understanding," arXiv PrePrint arXiv: 2204.10893v2 [cs.CL] Apr. 26, 2022, (13 pages), DOI: https://arxiv.org/pdf/2204.10893.pdf.

Notice of Allowance and Fees Due (PTOL-85) Mailed on Jan. 3, 2025 for U.S. Appl. No. 18/046,831, 15 page(s).

Notice of Allowance and Fees Due (PTOL-85) Mailed on Jan. 15, 2025 for U.S. Appl. No. 18/046,831, 2 page(s).

Stremmel, et al., "Extend and Explain: Interpreting Very Long Language Models", Proceedings of Machine Learning Research, vol. 193, pp. 1-43, Nov. 28, 2022, arXiv:2209.01174v3.

Notice of Allowance and Fees Due (PTOL-85) Mailed on Nov. 20, 2025 for U.S. Appl. No. 18/515,995, 8 page(s).

* cited by examiner

SELECTIVE INPUT DATA GENERATION FOR MACHINE LEARNING MODELS

BACKGROUND

Various embodiments of the present disclosure address technical challenges related to machine learning models and, more specifically, encoder language models and text-based machine learning classifiers. Predictive tasks may vary in complexity. The complexity of a predictive task may have a direct impact on both the performance and resource utilization of machine learning techniques applied for a particular task. Traditionally, a type of input to a machine learning model may impact of the complexity of a predictive task. Most machine learning models, for example, may leverage structured data inputs due to the lower level of complexity required for interpreting structured data. Some machine learning models leverage natural language inputs; however, the complexity of interpreting natural language limits the effectiveness of such techniques. Using multi-modal inputs that combine natural language with structured data presents a significant technical challenge due to the complexity of processing multiple input types. While some approaches exist for multi-modal prediction, these approaches require short and informative text sequence as features, which is traditionally unavailable due to deficiencies in language modeling, such as a lack of enterprise-level language models, and an inability to reliably extract predictive text sequences from large text corpuses. Even if done correctly, much of the information surfaced through natural language extraction is redundant in view of structured data. This leads to minimal improvements in the predictive performance of machine learning models, while increase the computer power and memory resources required to perform a predictive task.

Various embodiments of the present disclosure make important contributions to traditional machine learning technology by addressing these technical challenges, among others.

BRIEF SUMMARY

Various embodiments of the present disclosure provide improved training techniques for training language and classifiers models. Some embodiments of the present disclosure provide data balancing and training technique for training a domain-specific language model using a balanced training dataset. The domain-specific language model may be leveraged in a second training pipeline extract relevant information from long form text data and combining it with structured data for training a target machine learning model to make a prediction on multi-modal data. To do so, the domain-specific language model may be trained to encode semantic information from text sequence based on a partition-by-partition mix of enterprise and domain-specific text. This allows the domain-specific language model to create semantically dense embeddings. These embedding may be compared to prompts designed to extract text that complements, rather than overlaps, anticipated structured inputs. By doing so, some techniques of the present disclosure may coalesce natural language and structured inputs into a complementary multi-model input that is more predictive of a target prediction than traditional machine learning inputs. In this way, some techniques of the present disclosure solve technical challenges of incorporating natural language text with structured inputs, while reducing processing and memory resources required by complex predictive tasks.

In some embodiments, a computer-implemented method includes generating, by one or more processors and using a domain-specific language model, a plurality of text segment embeddings for a plurality of text segments of a plurality of input text documents associated with a predictive task; identifying, by the one or more processors, one or more prompt embeddings associated with the predictive task; generating, by the one or more processors, a plurality of task-specific similarity scores for the plurality of text segments based on a comparison between the plurality of text segment embeddings and the one or more prompt embeddings; identifying, by the one or more processors, a set of task-specific text segments from the plurality of text segments based on the plurality of task-specific similarity scores; and training, by the one or more processors, a target machine learning model based on the set of task-specific text segments.

In some embodiments, a system comprises memory and one or more processors communicatively coupled to the memory, the one or more processors configured to generate, using a domain-specific language model, a plurality of text segment embeddings for a plurality of text segments of a plurality of input text documents associated with a predictive task; identify one or more prompt embeddings associated with the predictive task; generate a plurality of task-specific similarity scores for the plurality of text segments based on a comparison between the plurality of text segment embeddings and the one or more prompt embeddings; identify a set of task-specific text segments from the plurality of text segments based on the plurality of task-specific similarity scores; and train target machine learning model based on the set of task-specific text segments.

In some embodiments, one or more non-transitory computer-readable storage media include instructions that, when executed by one or more processors, cause the one or more processors to generate, using a domain-specific language model, a plurality of text segment embeddings for a plurality of text segments of a plurality of input text documents associated with a predictive task; identify one or more prompt embeddings associated with the predictive task; generate a plurality of task-specific similarity scores for the plurality of text segments based on a comparison between the plurality of text segment embeddings and the one or more prompt embeddings; identify a set of task-specific text segments from the plurality of text segments based on the plurality of task-specific similarity scores; and train target machine learning model based on the set of task-specific text segments.

DETAILED DESCRIPTION

Figure 1:
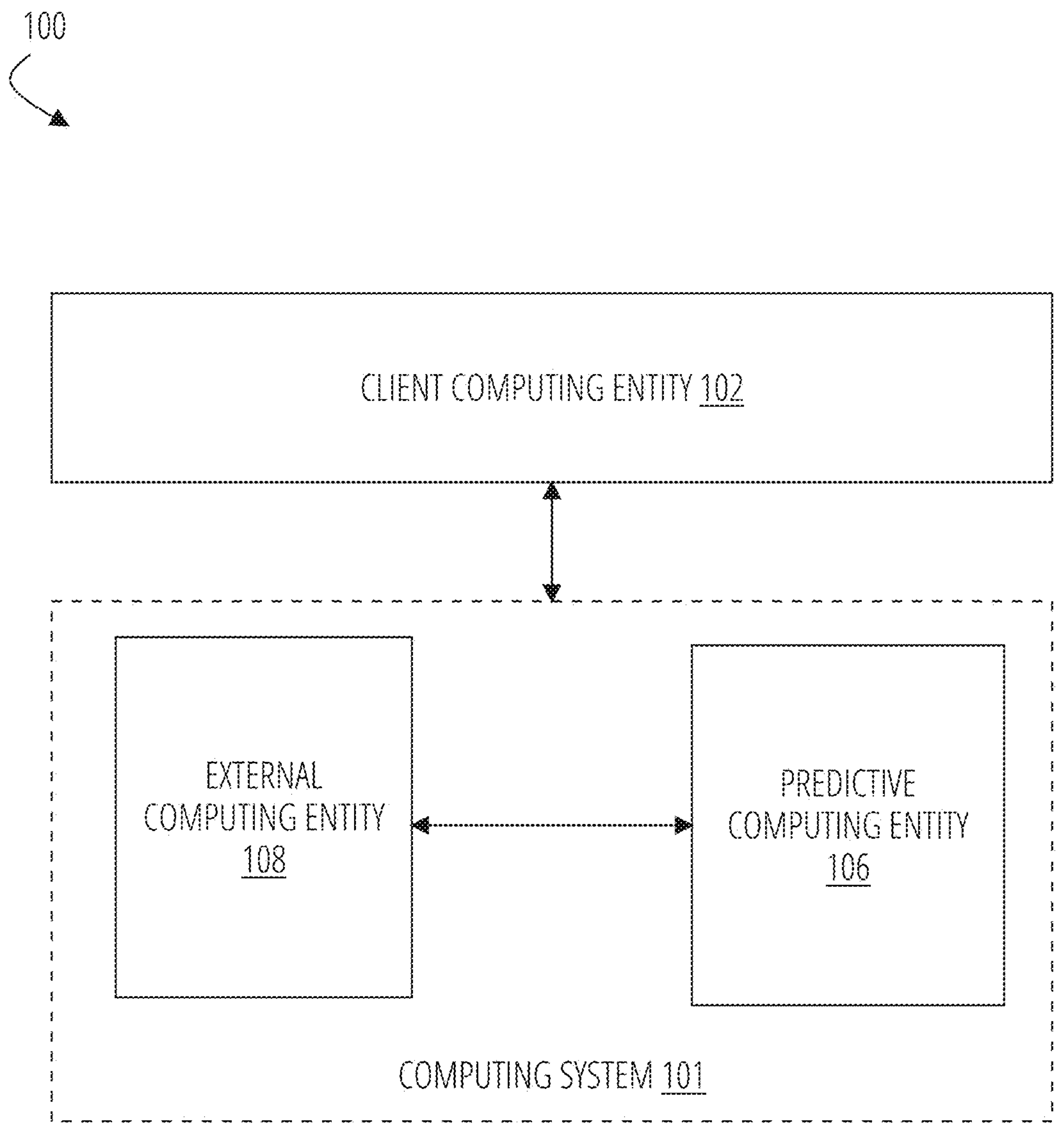
FIG. 1 provides an example overview of an architecture in accordance with some embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 provides an example overview of an architecture 100 in accordance with some embodiments of the present disclosure. The architecture 100 includes a computing system 101 configured to receive request, such as training requests, prediction requests, and/or the like, from client computing entities 102, process the requests to train and/or generative predictive outputs, and provide the trained models or predictive outputs to the client computing entities 102. The example architecture 100 may be used in a plurality of domains and not limited to any specific application as disclosed herewith. The plurality of domains may include banking, healthcare, industrial, manufacturing, education, retail, to name a few.

In accordance with various embodiments of the present disclosure, one or more machine learning models may be trained to generate embeddings, predictive outputs, and/or the like. The models may form one or more machine learning inference and/or training pipelines that may be configured to train a machine learning model and/or leverage a machine learning model to perform a predictive task. This technique will lead to more accurate and reliable language processing techniques that may be efficiently used for a diverse set of different cases.

In some embodiments, the computing system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The computing system 101 may include a predictive computing entity 106 and one or more external computing entities 108. The predictive computing entity 106 and/or one or more external computing entities 108 may be individually and/or collectively configured to receive requests from client computing entities 102, process the requests to generate outputs, such as classifications, text embeddings, and/or the like, and provide the generated outputs to the client computing entities 102.

For example, as discussed in further detail herein, the predictive computing entity 106 and/or one or more external computing entities 108 comprise storage subsystems that may be configured to store input data, training data, and/or the like that may be used by the respective computing entities to perform predictive data analysis and/or training operations of the present disclosure. In addition, the storage subsystems may be configured to store model definition data used by the respective computing entities to perform various predictive data analysis and/or training tasks. The storage subsystem may include one or more storage units, such as multiple distributed storage units that are connected through a computer network. Each storage unit in the respective computing entities may store at least one of one or more data assets and/or one or more data about the computed properties of one or more data assets. Moreover, each storage unit in the storage systems may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In some embodiments, the predictive computing entity 106 and/or one or more external computing entities 108 are communicatively coupled using one or more wired and/or wireless communication techniques. The respective computing entities may be specially configured to perform one or more steps/operations of one or more techniques described herein. By way of example, the predictive computing entity 106 may be configured to train, implement, use, update, and evaluate machine learning models in accordance with one or more training and/or inference operations of the present disclosure. In some examples, the external computing entities 108 may be configured to train, implement, use, update, and evaluate machine learning models in accordance with one or more training and/or inference operations of the present disclosure.

In some example embodiments, the predictive computing entity 106 may be configured to receive and/or transmit one or more datasets, objects, and/or the like from and/or to the external computing entities 108 to perform one or more steps/operations of one or more techniques (e.g., training techniques, and/or the like) described herein. The external computing entities 108, for example, may include and/or be associated with one or more entities that may be configured to receive, transmit, store, manage, and/or facilitate datasets, such as balanced training datasets, and/or the like. The external computing entities 108, for example, may include data sources that may provide such datasets, and/or the like to the predictive computing entity 106 which may leverage the datasets to perform one or more steps/operations of the present disclosure, as described herein. In some examples, the datasets may include container databases, order databases, and/or the like that may collect data from across a plurality of external computing entities 108 into one or more aggregated datasets. The external computing entities 108, for example, may be associated with one or more data repositories, cloud platforms, compute nodes, organizations, and/or the like, which may be individually and/or collectively leveraged by the predictive computing entity 106 to obtain and aggregate data for a prediction domain.

In some example embodiments, the predictive computing entity 106 may be configured to receive a trained machine learning model trained and subsequently provided by the one or more external computing entities 108. For example, the one or more external computing entities 108 may be configured to perform one or more training steps/operations of the present disclosure to train a machine learning model, as described herein. In such a case, the trained machine learning model may be provided to the predictive computing entity 106, which may leverage the trained machine learning model to perform one or more inference steps/operations of the present disclosure. In some examples, feedback (e.g., evaluation data, ground truth data, etc.) from the use of the machine learning model may be recorded by the predictive computing entity 106. In some examples, the feedback may be provided to the one or more external computing entities 108 to continuously train the machine learning model over time. In some examples, the feedback may be leveraged by the predictive computing entity 106 to continuously train the machine learning model over time. In this manner, the computing system 101 may perform, via one or more combinations of computing entities, one or more prediction, training, and/or any other machine learning-based techniques of the present disclosure.

A. Example Predictive Computing Entity

Figure 2:
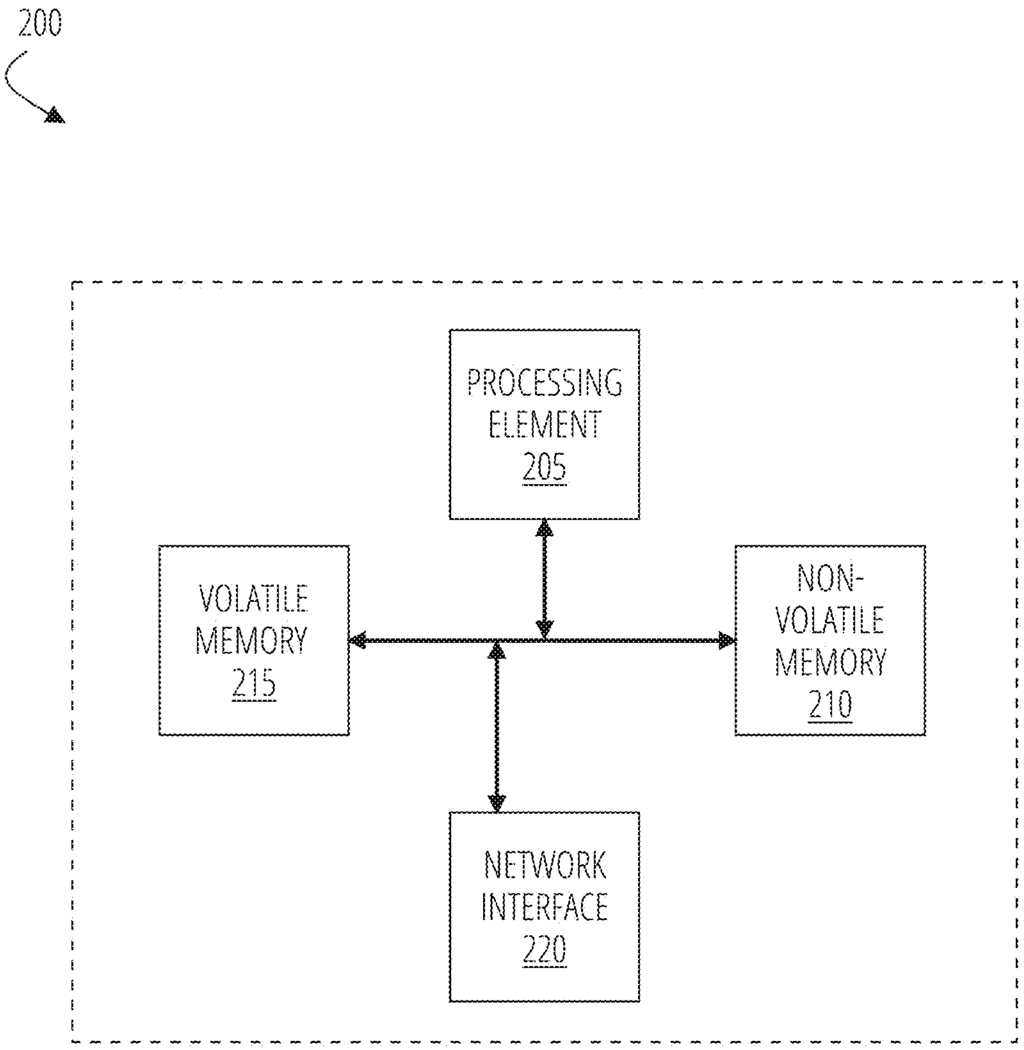
FIG. 2 provides an example predictive data analysis computing entity in accordance with some embodiments of the present disclosure.

FIG. 2 provides an example computing entity 200 in accordance with some embodiments of the present disclosure. The computing entity 200 is an example of the predictive computing entity 106 and/or external computing entities 108 of FIG. 1. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, training one or more machine learning models, monitoring, evaluating, comparing, and/or similar terms used herein interchangeably. In some embodiments, these functions, operations, and/or processes may be performed on data, content, information, and/or similar terms used herein interchangeably. In some embodiments, the one computing entity (e.g., predictive computing entity 106, etc.) may train and use one or more machine learning models described herein. In other embodiments, a first computing entity (e.g., predictive computing entity 106, etc.) may use one or more machine learning models that may be trained by a second computing entity (e.g., external computing entity 108) communicatively coupled to the first computing entity. The second computing entity, for example, may train one or more of the machine learning models described herein, and subsequently provide the trained machine learning model(s) (e.g., optimized weights, code sets, etc.) to the first computing entity over a network.

As shown in FIG. 2, in some embodiments, the computing entity 200 may include, or be in communication with, one or more processing elements 205 (also referred to as processors, processing circuitry, and/or similar terms used herein interchangeably) that communicate with other elements within the computing entity 200 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the computing entity 200 may further include, or be in communication with, non-volatile media (also referred to as non-volatile storage, memory, memory storage, memory circuitry, and/or similar terms used herein interchangeably). In some embodiments, the non-volatile media may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile media may store databases, database instances, database management systems, data, applications, programs, program modules, scripts, code (e.g., source code, object code, byte code, compiled code, interpreted code, machine code, etc.) that embodies one or more machine learning models or other computer functions described herein, executable instructions, and/or the like. The term database, database instance, database management system, and/or similar terms used herein interchangeably, may refer to a collection of records or data that is stored in a computer-readable storage medium using one or more database models; such as a hierarchical database model, network model, relational model, entity-relationship model, object model, document model, semantic model, graph model, and/or the like.

In some embodiments, the computing entity 200 may further include, or be in communication with, volatile media (also referred to as volatile storage, memory, memory storage, memory circuitry, and/or similar terms used herein interchangeably). In some embodiments, the volatile media may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, code (source code, object code, byte code, compiled code, interpreted code, machine code) that embodies one or more machine learning models or other computer functions described herein, executable instructions, and/or the like being executed by, for example, the processing element 205. Thus, the databases, database instances, database management systems, data, applications, programs, program modules, code (source code, object code, byte code, compiled code, interpreted code, machine code) that embodies one or more machine learning models or other computer functions described herein, executable instructions, and/or the like may be used to control certain aspects of the operation of the computing entity 200 with the assistance of the processing element 205 and operating system.

As indicated, in some embodiments, the computing entity 200 may also include one or more network interfaces 220 for communicating with various computing entities (e.g., the client computing entity 102, external computing entities, etc.), such as by communicating data, code, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In some embodiments, the computing entity 200 communicates with another computing entity for uploading or downloading data or code (e.g., data or code that embodies or is otherwise associated with one or more machine learning models). Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing entity 200 may include, or be in communication with, one or more input elements, such as a keyboard input, a mouse input, a touch screen/display input, motion input, movement input, audio input, pointing device input, joystick input, keypad input, and/or the like. The computing entity 200 may also include, or be in communication with, one or more output elements (not shown), such as audio output, video output, screen/display output, motion output, movement output, and/or the like.

B. Example Client Computing Entity

Figure 3:
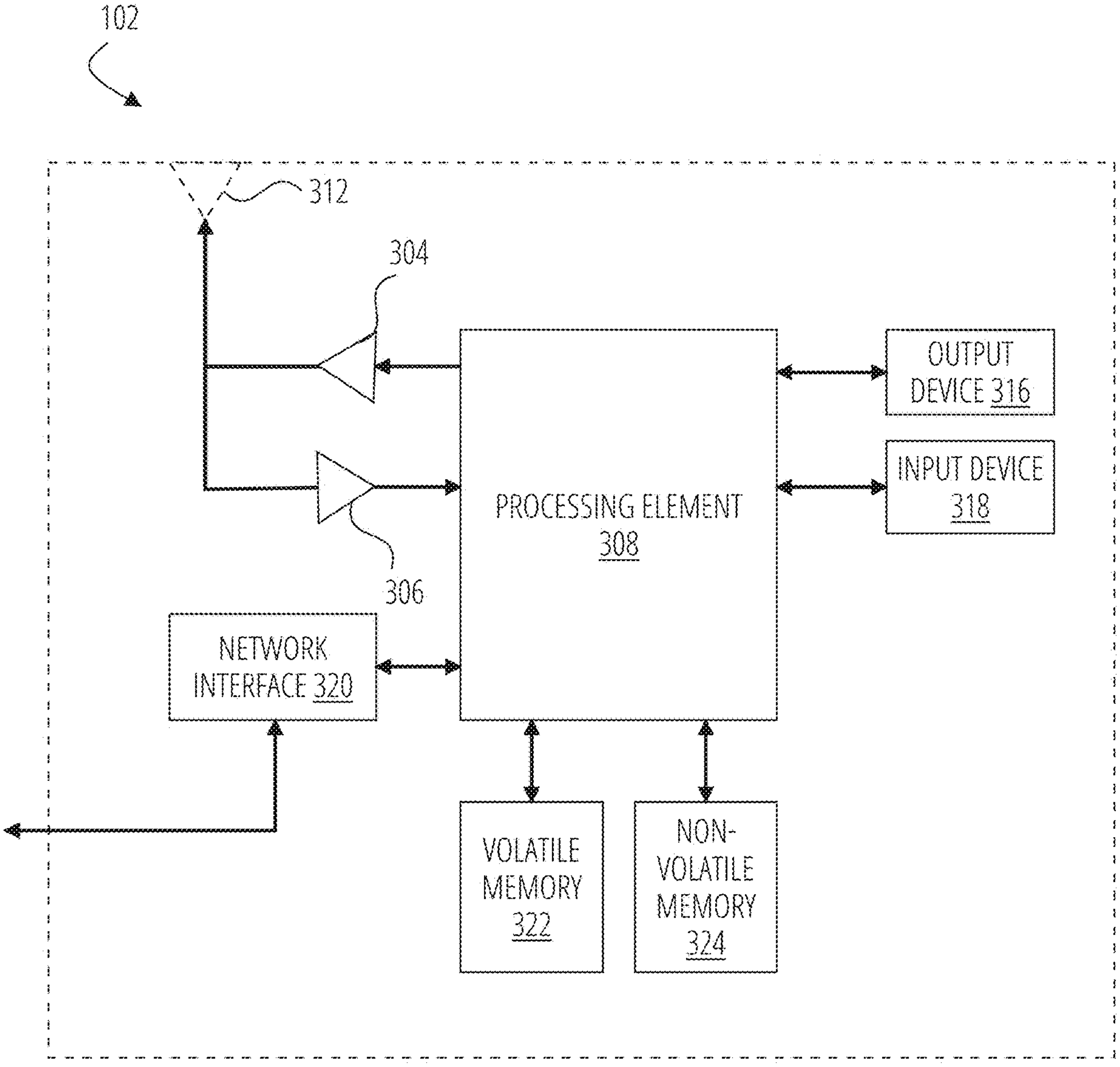
FIG. 3 provides an example client computing entity in accordance with some embodiments of the present disclosure.

FIG. 3 provides an example client computing entity in accordance with some embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 may be operated by various parties. As shown in FIG. 3, the client computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the computing entity 200. In some embodiments, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the computing entity 200 via a network interface 320.

Via these communication standards and protocols, the client computing entity 102 may communicate with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 may also download code, changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entity 102 in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entity 102 may also comprise a user interface (that may include an output device 316 (e.g., display, speaker, tactile instrument, etc.) coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the computing entity 200, as described herein. The user input interface may comprise any of a plurality of input devices 318 (or interfaces) allowing the client computing entity 102 to receive code and/or data, such as a keypad (hard or soft), a touch display, voice/speech or motion interfaces, or other input device. In some embodiments including a keypad, the keypad may include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client computing entity 102 may also include volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory may store databases, database instances, database management systems, data, applications, programs, program modules, scripts, code (source code, object code, byte code, compiled code, interpreted code, machine code, etc.) that embodies one or more machine learning models or other computer functions described herein, executable instructions, and/or the like to implement the functions of the client computing entity 102. As indicated, this may include a user application that is resident on the client computing entity 102 or accessible through a browser or other user interface for communicating with the computing entity 200 and/or various other computing entities.

In another embodiment, the client computing entity 102 may include one or more components or functionalities that are the same or similar to those of the computing entity 200, as described in greater detail above. In one such embodiment, the client computing entity 102 downloads, e.g., via network interface 320, code embodying machine learning model(s) from the computing entity 200 so that the client computing entity 102 may run a local instance of the machine learning model(s). As will be recognized, these architectures and descriptions are provided for example purposes only and are not limited to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. EXAMPLES OF CERTAIN TERMS

In some embodiments, the term "prediction domain" refers to an environment, space, class, and/or the like that describes a collection of related concepts. A prediction domain, for example, may be associated with one or more terminologies and a plurality of entities that use the terminologies to convey meaningful information. In this way, terminologies within a prediction domain may form a domain-specific language of the prediction domain that May impact the interpretation of text provided within the domain. A prediction domain may include any type of domain, including a clinical domain with various clinical terminologies, a manufacturing domain with various manufacturing terminologies, a computing domain with various computing terminologies, among other. In each domain, the terminology used may impact the meaning of the same text, such that domain-specific language model may outperform generic domain-agnostic language models.

In some embodiments, the term "enterprise" refers to an entity that operates within a prediction domain. An enterprise, for example, may include a group of users, a user platform, an organization, and/or the like that performs one or more activities within a prediction domain. As examples, an enterprise may include a healthcare provider (and/or provider network) that operates within a healthcare domain, a vehicle manufacturer that operates within a manufacturing domain, and/or the like. In some examples, through the performance of one or more activities, an enterprise may generate, receive, and/or otherwise collect a plurality of private documents with text that is reflective of an enterprise-specific terminology. An enterprise-specific terminology, for example, may form an enterprise-specific language that is specific to the enterprise's activities within the prediction domain.

In some embodiments, the term "predictive task" refers to an activity within a prediction domain that is configured to generate a prediction. In some examples, a predictive task may include a machine learning process configured to apply one or more machine leaning models to generate a prediction. In some examples, a predictive task may leverage natural language and/or structured text associated with a prediction domain to generate a prediction. In some examples, the natural language and/or structured text may be received from one or more domain and/or enterprise data sources.

In some embodiments, the term "domain data source" refers to a data source that includes a plurality of public documents for a prediction domain. A domain data source may depend on a prediction domain. For example, a domain data source may include an academic platform, a regulatory platform, a weblog, and/or the like, that provides access to a plurality of public documents. A DOMAIN DATA SOURCE MAY PROVIDE SETS OF AVAILABLE PUBLIC DATA FOR PRETRAINING A LANGUAGE MODEL FOR A PREDICTION DOMAIN. By way of example, in a clinical prediction domain, domain data sources may include the PUBMED NATIONAL LIBRARY OF MEDICINE PLATFORM, A MIMIC CLINICAL DATABASE, PUBLIC CLINICAL PRACTICE GUIDELINES, AND/OR THE LIKE.

In some embodiments, the term "public document" refers to a data entity that describes text that is associated with a prediction domain and accessible to a plurality of enterprises within the prediction domain.

In some embodiments, the term "enterprise data source" refers to a data source that is maintained by an enterprise. An enterprise data source, for example, may include a data structure (e.g., cloud database, centralized database, etc.) that stores a plurality of private documents for an enterprise.

In some embodiments, the term "private document" refers to a data entity that describes text that is associated with a prediction domain and accessible to an enterprise within the prediction domain. A private document, for example, may include text that is stored by an enterprise in a private repository. In some examples, a private document may be subject to one or more security constraints that restrict access of the private document to an enterprise. By way of example, in a clinical prediction domain, a private document may include clinical notes for a patient that is subject to privacy restrictions.

In some embodiments, the term "domain-specific data partition" refers to a data entity that describes a text segment from a public document. A domain-specific data partition, for example, may include a pretraining text sequence for a language model that is extracted from a public document for a prediction domain. In some examples, a plurality of domain-specific data partitions may be generated from a plurality of public documents by splitting the plurality of public documents into a plurality of non-overlapping text sequences. In some examples, the plurality of public documents may be split according to a predefined sequence length.

In some embodiments, the term "predefined sequence length" refers to a data constraint that defines a maximum sequence length of a data partition. A predefined sequence length may be a configurable parameter. In some examples, the predefined sequence length may be configured based on a language model. For instance, the predefined sequence length may be set to a maximum input size of a language model.

In some embodiments, the term "enterprise data partition" refers to a data entity that describes a text segment from a private document. An enterprise data partition, for example, may include a pretraining text sequence for a language model that is extracted from a private document for an enterprise within a prediction domain. In some examples, a plurality of enterprise data partitions may be generated from a plurality of private documents by splitting the plurality of private documents into a plurality of non-overlapping text sequences. In some examples, the plurality of private documents may be split according to the predefined sequence length.

In some examples, a plurality of private documents may be segmented into a plurality of enterprise data partitions. As described herein, the plurality of enterprise data partitions may be leveraged to generate a balanced training dataset. For example, the plurality of enterprise data partitions may be blended with a plurality of domain-specific data partitions to generate the balanced training dataset. In some examples, a balanced training dataset may include a balanced training partition for each of the plurality of enterprise data partitions.

In some embodiments, the term "balanced training dataset" refers to a data structure that describes a pretraining dataset for a language model. A balanced training dataset, for example, may include a plurality of balanced training partitions that individually balance enterprise and domain-specific data. For instance, a balanced training dataset may include a mix of private document data from an enterprise data source and public document data from domain data sources for pretraining a language model. By doing so, the balanced training dataset may train a language model to learn an enterprise specific language that is rooted in domain terminology.

The balanced training dataset may be generated by combining an enterprise partition dataset (e.g., including a plurality of enterprise data partitions, etc.) with a domain-specific partition dataset (e.g., including a plurality of domain-specific data partitions, etc.) that are initially stored as separate data structures (e.g., a file, a plurality of files per dataset, etc.). The balanced training dataset may be generated by loading and combining enterprise and domain-specific data partitions, partition by partition, and then shuffling the resulting balanced training partitions, such that the balanced training dataset includes parquet partitions.

In some embodiments, the term "balanced training partition" refers to a data entity of a balanced training dataset. A balanced training partition, for example, may include a data partition that includes at least a portion of an enterprise data partition and at least a portion of a domain-specific data partition. In some examples, a balanced training partition may be configured according to a predefined hardware constraint. In some examples, the probability that a given row of a balanced partition is from an enterprise data partition may be equal to a total number of enterprise data partitions divided by a total number of balanced training partitions. In addition, or alternatively, a balanced training partition may have the property that the probability that a row from a balanced training partition is from the domain-specific data partition may be equal to a total number of public documents divided by the total number of balanced training partitions. This may be accomplished by reading all domain-specific data into memory partition by partition and adding an equal amount of each domain-specific data partition to each initial training partition and then shuffling the final partitions. This ensures that enterprise and domain-specific data is uniformly distributed throughout the balanced training dataset.

In some embodiments, the term "initial training partition" refers to a data entity that describes an initially loaded training partition from an enterprise data partition before the training partition is balanced by loading a portion of a domain-specific data partition.

In some embodiments, the term "indexed position" refers to a position of the balanced training partition within a balanced training dataset. In some examples, the indexed positions of a plurality of balanced training partitions within a balanced training dataset may be modified to shuffle the balanced training dataset.

In some embodiments, the term "predefined hardware constraint" refers to a data constraint that describes a maximum sequence length of a balanced training partition. A predefined hardware constraint may be a configurable parameter. In some examples, the predefined hardware constraint may be configured based on a hard disk partition size.

In some embodiments, the term "domain-specific language model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A domain-specific language model may include any type of model configured, trained, and/or the like to generate an encoded output, such as a text embedding (e.g., text segment embedding, prompt embedding, etc.), for a text segment. A domain-specific language model may include one or more of any type of machine learning model including one or more supervised, unsupervised, semi-supervised, reinforcement learning models, and/or the like. For instance, a domain-specific language may include a machine learning language model, such as a bidirectional transformer, that may be trained using a balanced training dataset. By way of example, a domain-specific language model may include a bidirectional encoder-based language model, such as bidirectional encoder representations from transformers (BERT) model, a robustly optimized BERT pretraining approach (RoBERTa) model, and/or the like.

In some embodiments, the domain-specific language model is trained, using the balanced training dataset, from random initialization. In some examples, the domain-specific language model may be pretrained and then refined using continued masked language modeling and the balanced training dataset. In addition, or alternatively, the domain-specific language model may be initialized as a masked language model and pretrained on the balanced training dataset until convergence via early stopping. In some examples, prior to pretraining the domain-specific language model, a tokenizer (e.g., a byte-pair encoding subword, etc.) may be learned to represent the balanced training dataset using the most efficient (e.g., for the given tokenization algorithm) number of subwords for a given vocabulary size (typically 50 k tokens). The tokenizer may be used, with the domain-specific language model, to tokenize documents, text segments, prompts, and/or any other text of the present disclosure.

In some embodiments, the term "input text document" refers to a data entity that describes an input document for a predictive task. In some examples, an input text document may include a private document that is associated with a target entity. The target entity, for example, may be a target of a prediction and the input text document may include text segments that may be predictive of the prediction. By way of example, in a clinical prediction domain, a predictive task may include a disease progression prediction for a patient and the input text document may include a clinical note for the patient.

In some embodiments, the term "input document threshold" refers to a data constraint that defines a maximum number of input text documents for a predictive task. An input document threshold, for example, may be a configurable parameter for limiting a number of input text documents. In some examples, the input document threshold may limit a number of text documents available for an entity that may be selected as input text documents for a predictive task. For example, the input document threshold may define a maximum number of text documents from a plurality of text documents available for an entity that may be selected for a predictive task. Using the input document threshold, a subset of input text documents from a plurality of text documents for an entity may be selected for analysis during a predictive task. In this manner, the number of text documents available for an entity may be truncated to improve processing speeds for performing the predictive task. In some examples, the input document threshold may be set to a high number of documents to prevent truncating the text documents available for a majority (e.g., 95%, 80%, 51%, etc.) of the plurality of entities, while truncating the text documents available for outlier entities associated with a large number of text documents relative to the remaining plurality of entities. In this way, a number of input text documents considered for a plurality of entities may be standardized using truncation.

In some examples, an input document threshold may be defined based on a number of text documents available for each of a plurality of entities associated with an enterprise. By way of example, the input document threshold may include the threshold percentile (e.g., 95th percentile, etc.) of the number of text documents available for each entity over a feature window. By way of example, input document threshold may be defined by identifying the threshold percentile based on a distribution (e.g., histogram, etc.) of a count of available text documents across each of a plurality of entities. From this distribution, one or more percentiles may be computed that reflect a number of text document available for a percentage of the plurality of entities. The number of text document available of the threshold percentile may be identified from the one or more percentiles and used to define the input document threshold.

In some embodiments, the term "recordation time" refers to a data value that describes a time stamp for an input text document. A recordation time, for example, may describe a time at which an input text document in created (e.g., creation time, etc.), a time at which an event associated with an input text document occurs (e.g., an event date, etc.), and/or the like.

In some embodiments, the term "input document sequence" refers to an input to a domain-specific language model. An input document sequence, for example, may include a plurality of input text documents. For example, the plurality of input text documents may be ordered as a single ordered sequence for inputting to the domain-specific language model. In some examples, the plurality of input text documents may be ordered according to a plurality of recordation times respectively associated with the plurality of input text documents. By way of example, the input document sequence may include a dataset of a plurality of input text documents ordered by recordation time (e.g., creation time, event date, etc.). As described herein, the input document sequence may be processed by a domain-specific language model to extract a natural language text for one or more downstream models. In some examples, the extracted a natural language text (e.g., task-specific text segments, etc.) may be combined with a tabular dataset of structured data entries (e.g., medical records in the form of medical codes, etc.) including a set of codes respectively associated with their own recordation times (e.g., creation time, event date, etc.).

In some embodiments, the term "text segment" refers to a data entity that describes a portion of text from an input document sequence. A text segment, for example, may include one or more characters, words, and/or sentences extracted from an input document sequence and/or input text document thereof. By way of example, a sentence splitting operation may be performed on the input document sequence to split the input document sequence into a plurality of text segments. In some examples, each text segment may be compared, using the some of the techniques of the present disclosure, to a populated query template to extract one or more task-specific text segments for a predictive task.

In some embodiments, the term "text segment embedding" refers to a data entity that describes an encoding of a text segment. A text segment embedding, for example, may include an output of a domain-specific language model. The text segment embedding may include a tokenized and embedded text segment from the plurality of text segments.

In some embodiments, the term "query template" refers to a data entity that describes a template for constructing a prompt. A query template, for example, may include a text template, one or more modifiable template sections, and/or population instructions. The text template may include predefined text that describes one or more task-agnostic portions of the prompt. The one or more modifiable template sections may include modifiable text that describe one or more task-specific portion of the prompt. The text template with the one or more modifiable template sections enables a user to adapt one template for any of a plurality of predictive tasks within a prediction domain.

By way of example, a query template for a clinical domain may include:

For disease outcomes D1, D2, . . . , DN, include evidence that each disease might be impending as E1, E2, . . . , EM for each disease. Do not provide synonyms or other conditions which define or are directly correlated with each disease; rather, provide the most likely predictors which are not present in structured medical codes such as ICDs, NDCs, and CPTs. For each disease Di, provide M Eijs to populate a query string: "<disease> comorbidities or evidence of impending condition such as <condition_examples>" where the query string will be produced for each disease and <disease> will be replaced with the given disease Di while <condition_examples> will be replaced by each corresponding Eij.

By way of example, a query template for a clinical domain may include population instructions, such as 'Imagine you are google searching over all the clinical notes written for a patient to extract some information which isn't obviously present in the claims record,' and/or the like, to help a user and/or automated agent populate the modifiable template sections of the query template.

A user (and/or automated agent) may adapt the query template to a predictive task by providing task-specific information specific to the predictive task. In some examples, the population instructions may guide a user to provide the task-specific information. In addition, or alternatively, a query template may be populated using an automated agent. For example, the population instructions may include one or more automated queries (e.g., to one or more public data sources, etc.) to receive the task-specific information for populating the query template. By way of example, a query template may be given to a user (e.g., a clinical annotator, etc.) and/or an automated agent (e.g., a query system, generative language model, etc.) as an instruction to complete one or more modifiable template sections of the query template to generate a populated query template.

In some embodiments, the term "populated query template" refers to a query template with one or more completed modifiable template sections. A populated query template, for example, may be generated by updating one or more modifiable template sections of a query template. In some examples, once a populated query template is populated, the populated query template may be reusable for the predictive task. In some examples, the populated query template may be adjusted based on a performance of the predictive task.

In some embodiments, the term "query text segment" refers to a data entity that describes a sequence of text reflective of a prompt for extracting task-specific text segments. A query text segment, for example, may include a prompt-based query text segment that is generated based on and/or from the populated query template. In addition, or alternatively, a query text segment may include one or more input-based query text segment that are provided as additional and/or alternative conditions to a prompt-based query text segment. An input-based query text segment, for example, may include a query that is not sourced from a populated query template. For instance, the input-based query text segment may be manually generated, received based on user feedback, generated through one or more ancillary queries, and/or the like. Each query text segment may include textual phrase, individual predictor words, and/or the like that reflect one or more predictors for a predictive task.

Each query text segment for a predictive task may be designed to extract natural language evidence related to multiple dimensions of a predictive task, while minimizing an overlap with structured data. An example set of queries for a clinical domain may include (1) a prompt-based query text segment: "Predictors of <disease>" where <disease> is replaced with the appropriate Di and/or one or more input-based query text segments (2) "Social determinants of health," (2) "Pain or discomfort," (3) "Clinical information," (4) "Smoking status," (5) "Signs of declining health," and/or the like.

In some embodiments, the term "prompt embedding" refers to a data entity that describes an encoding of a query text segment. A prompt embedding, for example, may include an output of a domain-specific language model. The prompt embedding may include a tokenized and embedded query text segment from one or more query text segments. For example, each of the one or more query text segments may be input to the domain-specific language model, which may tokenize and convert each query text segment to a respective prompt embedding using mean pooling or another encoding approach to arrive at one vector per query text segment. The query text segments, once embedded as prompt embedding, may be used to extract task-specific text segments semantically related to a predictive task from the plurality of text segments. For example, the task-specific text segments may be extracted based on task-specific similarity scores between the prompt embeddings and the text segment embeddings.

In some embodiments, the term "task-specific similarity scores" refers to a data value that describes a semantic similarity between a query text segment and a text segment. A task-specific similarity score, for example, may be generated for each combination of text segment and query text segment pairs. Each task-specific similarity score may be based on a comparison between a prompt embedding of a query text segment and a text segment embedding of a text segment of a text segment and query text segment pair. The task-specific similarity score may include any type of embedding similarity score, such as a cosine similarity score, and/or the like. In this way, a task-specific similarity score may represent a semantic similarity between a text segment and a query text segment by comparing the contextual representations of each (e.g., the respective embeddings) in embedding space where similar ideas and concepts may be encoded in mathematically similar vectors. As described herein, in some examples, a plurality of task-specific similarity scores may be used to rank each of the plurality of text segments with respect to each of the query text segments. In some examples, the resulting ranked lists may identify sentence-level evidence most predictive of an outcome of interest for a predictive task.

In some embodiments, the term "ranked list" refers to a data structure that describes an ordering of a plurality of text sequences. A ranked list, for example, may identify a relative similarity of each of the plurality of text sequences relative to a query text segment. For example, a ranked list may arrange the plurality to text sequences in order of their respective task-specific similarity scores with a particular query text segment. In some examples, a ranked list may be generated for each of one or more query text segments. Each ranked list may arrange the plurality of text segments, based on their task-specific similarity score, in order of their respective similarity to a particular query text segment. For example, a first ranked list may rank the plurality of text segments with respect to a prompt-based query text segment, a second ranked list may rank the plurality of text segments with respect to a first input-based query text segment, and/or the like. In some examples, one or more task-specific text segments may be identified from each of a plurality of ranked lists based on a plurality of significance weights respectively corresponding to the plurality of query text segments of the plurality of ranked lists and threshold evidence limit.

In some embodiments, the term "significance weight" refers to a data parameter that defines a relative significance of a query text segment. A significant weight may be a configurable parameter that defines a number of task-specific text segments (and/or proportion of a threshold evidence limit) that may be selected from a ranked list corresponding to a particular query text segment. By way of example, a first significance weight for a prompt-based query text segment corresponding to a first ranked list may indicate a first number of task-specific text segments (e.g., 40, 40% of a threshold evidence limit, etc.) that may be selected from the first ranked list as task-specific text segments. A second significance weight for an input-based query text segment corresponding to a second ranked list may indicate a second number of task-specific text segments (e.g., 20, 20% of a threshold evidence limit, etc.) that may be selected from the second ranked list as task-specific text segments.

Other examples may include a third significance weight identifying a third number of task-specific text segments (e.g., 10, 10% of a threshold evidence limit, etc.) that may be selected from the third ranked list, a fourth significance weight identifying a fourth number of task-specific text segments (e.g., 10, 10% of a threshold evidence limit, etc.) that may be selected from the fourth ranked list, a fifth significance weight identifying a fifth number of task-specific text segments (e.g., 10, 10% of a threshold evidence limit, etc.) that may be selected from the fifth ranked list, a sixth significance weight identifying a sixth number of task-specific text segments (e.g., 5, 5% of a threshold evidence limit, etc.) that may be selected from the sixth ranked list, and/or a seventh significance weight identifying a seventh number of task-specific text segments (e.g., 5, 5% of a threshold evidence limit, etc.) that may be selected from the seventh ranked list.

Any number and/or distribution of significance weights may be applied to a plurality of query text segments to optimize a performance of a target machine learning model. The significance weights may be predetermined. In addition, or alternatively, the significance weights may be dynamically configured based on a performance of a target machine learning model.

In some embodiments, the term "task-specific text segment" refers to a text segment that is selected as input to a target machine learning model. A task-specific text segment, for example, may include a natural language sequence of text that is predetermined to have a predictive impact on a prediction of a target machine learning model. In some examples, a plurality of task-specific text segments may be selected from a plurality of ranked lists respectively corresponding to a plurality of query text segments based on a plurality of significance weights respectively corresponding to the plurality of query text segments and a threshold evidence limit.

In some embodiments, the term "threshold evidence limit" refers to a data constraint that defines a maximum number of task-specific text segments for a predictive task. A threshold evidence limit, for example, may be a configurable parameter that may constrain a natural language input size of a multi-modal input to a target machine learning model. In some examples, the threshold evidence limit may include one or more hyperparameters that are optimized in an end-to-end fashion using random or Bayesian grid search.

In some embodiments, a threshold evidence limit includes a selection limit and an input limit. A selection limit may define an initial number of candidate task-specific text segments selected from a plurality of ranked lists. In some examples, a selection limit may be initially defined as a total of 100 task-specific text segments and optimized from the initial total. In some examples, the initial number of candidate task-specific text segments may be deduplicated to remove one or more redundant candidate text segments from the initial number of candidate task-specific text segments. The remaining number of candidate task-specific text segments may be filtered based on the input limit.

An input limit may define a standardized number of task-specific text segments for input to a target machine learning model. In some examples, the input limit may be defined based on the remaining number of candidate task-specific text segments available for each of a plurality of entities associated with an enterprise. By way of example, the input limit may include the threshold percentile (e.g., 95th percentile, etc.) of the remaining number of candidate task-specific text segments available for each of a plurality of entities. By way of example, the threshold percentile in terms of the number of remaining candidate task-specific text segments produced for each entity in a training dataset may be identified as the input limit.

In some examples, the remaining number of candidate task-specific text segments may be truncated to the number of task-specific text segments defined by the input limit.

In some embodiments, the term "target machine learning model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A target machine learning model may include any type of model configured, trained, and/or the like to generate a predictive output for a predictive task. A target machine learning model may include one or more of any type of machine learning model including one or more supervised, unsupervised, semi-supervised, reinforcement learning models, and/or the like. In some examples, the target machine learning model may include a plurality of machine learning models.

In some embodiments, a target machine learning model is a stacked ensemble model configured to combine natural language text inputs with structured inputs. For instance, the target machine learning model may include a stacked ensemble classification model. The stacked ensemble classification model may receive a multi-modal input entry. The multi-modal input entry may include a task-specific text sequence that combines a plurality of task-specific text segments based on their task-specific similarity scores. In addition, the multi-modal input entry may include structured data for an entity corresponding to the task-specific text sequence. The target machine learning model may include a plurality of machine learning classifiers (e.g., neural network layers, regression networks, branching decision trees, and/or any other classifier architecture) respectively configured to generate a plurality of sub-predictions for a predictive task based on the task-specific text sequence, the structured data, and/or both.

The target machine learning model may be configured to provide one or more portions of the multi-modal input entry to each of the plurality of machine learning classifiers and receive a plurality of sub-predictions from the plurality of machine learning classifiers. The target machine learning model may be trained to combine the plurality of sub-predictions, using a meta-classifier, with weights learned on out-of-fold data. By way of example, the target machine learning model may be trained using a framework such as AutoGluon to handle the overhead associated with managing out-of-fold predictions to avoid overfitting.

In some examples, a target machine learning model may include a stacked ensemble architecture to improve performance on multi-modal data, including natural language text sequences and structured data. The stacked ensemble architecture, for example, may provide multiple opportunities for interactions between the text and structured input modalities of a multi-modal input entry. In some examples, a meta-classifier of the target machine learning model may be trained to learns weights for the plurality of sub-predictions from the plurality of machine learning classifiers. In this manner, the meta-classifier may combine multiple sub-predictions from multiple models and data sources to generate a prediction output.

The target machine learning model (e.g., meta-classifier and/or the plurality of classifier models) may be trained, using supervisory training techniques, based on a labeled training dataset for a predicted task. By way of example, a labeled training dataset may include a plurality of multi-modal training entries respectively associated with a plurality of training entities. The target machine learning model may be trained to optimize a performance of the model with respect to a plurality of training labels respectively corresponding to the plurality of training entries. In some examples, the meta-classifier and/or the plurality of classifier models may be trained end-to-end. In addition, or alternatively, the meta-classifier and/or the plurality of classifier models may be trained in one or more stages. For example, the plurality of classifier models may be pretrained and/or trained in a first training stage and the meta-classifier may be trained in a second stage after freezing the weights of the plurality of classifier models.

In some embodiments, the term "multi-modal training entry" refers to a data entity that describes a training input for a target machine learning model. A multi-modal training entry may include a natural language portion and a structured language portion.

The natural language portion may include a task-specific text sequence that combines a plurality of task-specific text segments based on their task-specific similarity scores. In some examples, text features of the plurality of task-specific text segments may be represented as N-Gram features over phrases of text and/or encoded using Term Frequency Inverse Document Frequency and/or as text embeddings using the domain-specific language model.

A structured language portion may include one or more structured data entries. A structured data entry, for example, may include a structured code (e.g., a medical code in a clinical domain, etc.) that is defined within a prediction domain. In some examples, a training entity may be associated with a structured history that identifies a plurality of structured data entries for the training entity. In some examples, the structured data entries may be represented as a vector of one-hot encoded features.

In some embodiments, the term "training entity" refers to a data entity that describes an entry of a training dataset. A training entity may be any entity that is associated with natural language and/or structured text. By way of example, in a clinical domain, a training entity may be a patient that is associated with a plurality of clinical notes (e.g., natural language text) and a clinical history (e.g., structured text).

In some embodiments, the term "training label" refers to a data entity that describes a ground truth for a training entity. A training label, for example, may include a recorded outcome for a training entity that identifies a desired result of a prediction for a predictive task. The training label may include a binary value, a continuous value, a value range, and/or the like. By way of example, a training label may include a binary value indicating whether an event occurred within a time period. As a clinical example, a training label may include a binary value indicative of a disease onset and/or a level of progression of a disease in a time period.

In some embodiments, the term "training output" refers to an output of a target machine learning model. A training output, for example, may include a prediction output for a predictive task. The training output may include a binary value, a continuous value, a value range, and/or the like. By way of example, a training output may include a probability estimate for a target prediction. As a clinical example, a training output may include a probability estimate for disease onset or progression in the next N years (e.g., N=1).

IV. OVERVIEW

Various embodiments of the present disclosure provide improved machine learning techniques for addressing technical challenges presented by multi-modal data. Traditional, multi-modal classification frameworks typically exist as standalone solutions in which the performance of the frameworks directly correlates with the relevance of text inputs. However, real-world settings typically involve many text data points over time. These text blobs with associated event dates form long ordered sequences, where much of the information in these sequences is irrelevant to a given classification task or redundant with existing structured data. This leads to increased compute and memory resource requirements for performing a predictive task, with minimal performance increases. Some of the improve machine learning techniques of the present disclosure address this technical challenge by developing a new language model using data balancing techniques and then leveraging the language model to extract semantically significant text from a long-ordered text sequences that is both predictive of a target prediction and not redundant in view of available structured data.

In some embodiments, the data balancing technique leverages a balanced training dataset to train a language model on both enterprise and domain-specific text. For example, the language model may be trained on a combination text from a private data source with relevant public data to select evidence which is relevant to predicting a target outcome. In some examples, the evidence may be selected based on a semantic similarity between a text segment and query template that encourages the inclusion of data elements which are non-overlapping with available structured data. By doing so, the language model may ensure that natural language sequence complement structure data, rather than duplicate or obscure the signals provided by the data.

With respect to the data balancing techniques, traditional techniques exist for training domain-specific machine learning model. However, due to security and accessibility challenges, traditional domain-specific machine learning models are trained on public data that lacks enterprise level insights necessary to understand language at an enterprise level. The techniques of the present disclosure augment domain-specific data with enterprise-level to improve the predictive performance of language models with respect to an enterprise. Moreover, the partition-by-partition augmentation approach enables the partition level blending of enterprise data with public data to improve the language processing capabilities of a language model without introducing model bias or exposing secured information reflected by enterprise data, as a whole.

Some techniques of the present disclosure may improve language interpretation using a domain-specific language model trained on a balanced training dataset. These improvements may be leveraged by an evidence extractor to combine textual evidence with structures data in a manner that complements, rather than detracts from, the predictive features of the structured data. For example, the domain-specific language model may be used with a populated query template that encourages the selection of textual evidence that do not contain overlapping information with the structured inputs. To do so, the populated query template may include task-specific information that complements anticipated features of structure inputs. The task-specific information may be encoded with a plurality of candidate text sequences and the resulting embedding may be compared to identity candidate text sequences that are semantically similar to the complementary task-specific information. By doing so, task-specific text sequences may be extracted from a robust text dataset that improve the predictiveness of a machine learning model input without causing redundant computing operations to processing overlapping features.

In some examples, the techniques of the present disclosure may enable stacked ensembles that combine predictions from separate classifiers optimized for text and structured data, respectively. That is, the multi-modal inputs of the present disclosure may enable multiple ways to design model interactions between task-specific textual evidence and structured data via the stacked ensemble, combining base model predictions to produce the best overall prediction for a given predictive task.

Examples of technologically advantageous embodiments of the present disclosure include: (i) improved data balancing techniques, (ii) improved language model training techniques, (iii) improved machine learning training and inference techniques, among other aspects of the present disclosure. Other technical improvements and advantages may be realized by one of ordinary skill in the art.

V. EXAMPLE SYSTEM OPERATIONS

As indicated, various embodiments of the present disclosure make important technical contributions to machine learning technology. In particular, systems and methods are disclosed herein that implement a language model training technique that may be used to improve text interpretation by a computer. Moreover, systems and methods are disclosed herein that integrate improved language model within a classification pipeline to generate multi-model inputs for a target machine learning model. By doing so, some of the techniques of the present disclosure may improve machine learning performance, while reducing processing and memory resources traditionally required for predictive tasks.

Figure 4:
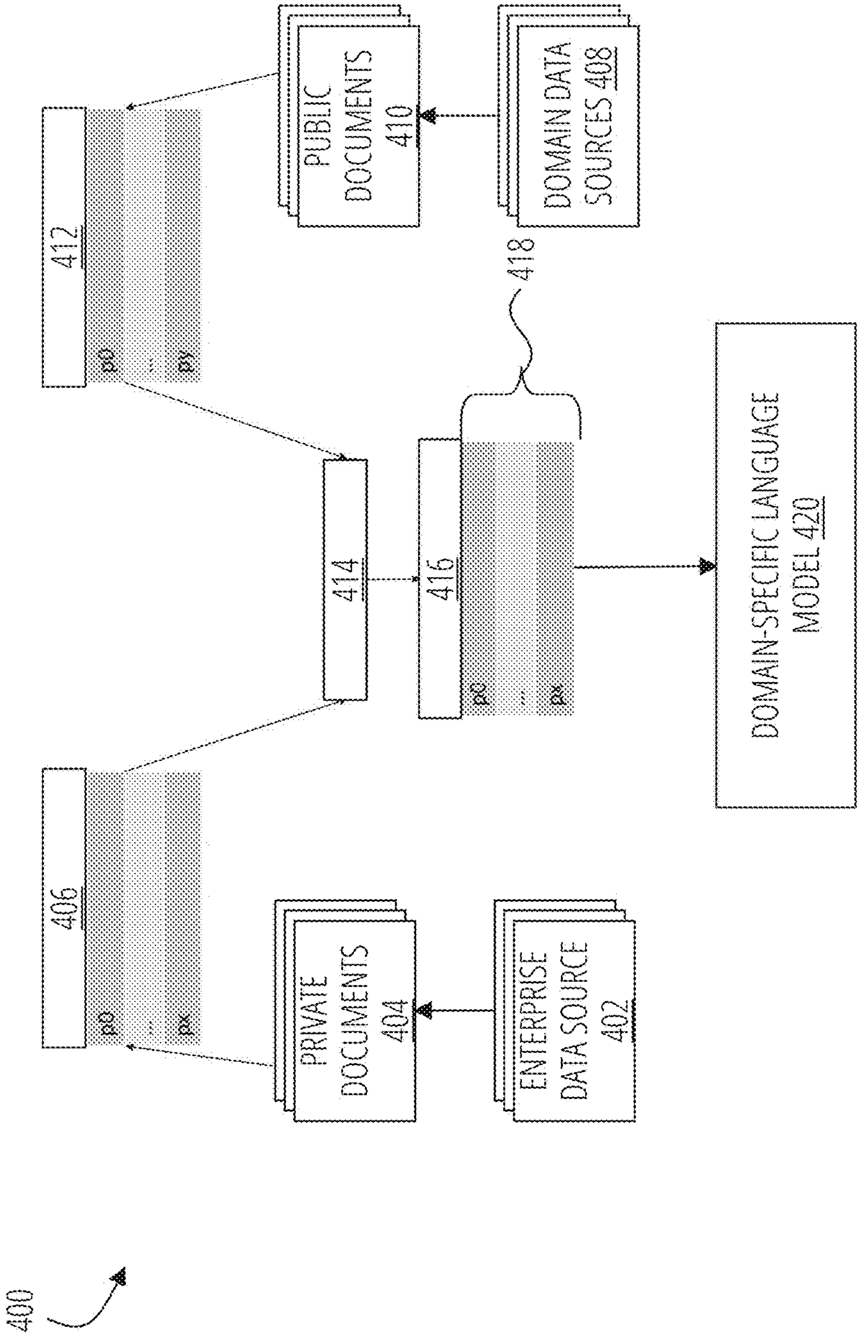
FIG. 4 is an example data flow diagram of a language model training pipeline in accordance with some embodiments discussed herein.

FIG. 4 is an example data flow diagram of a language model training pipeline 400 in accordance with some embodiments discussed herein. The language model training pipeline 400 includes a data balancing technique for leveraging private documents 404, subject to security measures, to train a domain-specific language model 420 based on an enterprise's unique language within a prediction domain. The data balancing technique may balance enterprise data partitions 406 with domain-specific data partitions 412 sources from domain data sources 408 to generate a balanced training dataset 416 that balances an enterprise-specific language with a domain-specific language. In this way, the language model training pipeline 400 may train a domain-specific language model 420 that may interpret the nuances of enterprise terminologies, while remaining ground in the domain-specific language in which the enterprise operates. This may improve the predictive performance of language models, while addressing privacy concerns with using private documents for training purposes. For example, by blending the private documents 404 with domain-specific data at a partition level, language model training pipeline 400 may effectively use private information for training a language model without exposing details expressed by private documents 404.

In some embodiments, an enterprise data partition 406 is received from a plurality of enterprise data partitions associated with an enterprise data source 402. The enterprise data source 402, for example, may include a plurality of private documents 404 accessible to an enterprise within a prediction domain. In some examples, the plurality of enterprise data partitions 406 may include a plurality of first non-overlapping text sequences extracted from the plurality of private documents 404.

In some embodiments, the enterprise data source 402 is a data source that is maintained by an enterprise. The enterprise data source 402, for example, may include a data structure (e.g., cloud database, centralized database, etc.) that stores a plurality of private documents 404 for an enterprise.

In some embodiments, an enterprise is an entity that operates within a prediction domain. An enterprise, for example, may include a group of users, a user platform, an organization, and/or the like that performs one or more activities within a prediction domain. As examples, an enterprise may include a healthcare provider (and/or provider network) that operates within a healthcare domain, a vehicle manufacturer that operates within a manufacturing domain, and/or the like. In some examples, through the performance of one or more activities, an enterprise may generate, receive, and/or otherwise collect a plurality of private documents 404 with text that is reflective of an enterprise-specific terminology. An enterprise-specific terminology, for example, may form an enterprise-specific language that is specific to the enterprise's activities within the prediction domain.

In some embodiments, a prediction domain is an environment, space, class, and/or the like that describes a collection of related concepts. A prediction domain, for example, may be associated with one or more terminologies and a plurality of entities that use the terminologies to convey meaningful information. In this way, terminologies within a prediction domain may form a domain-specific language of the prediction domain that may impact the interpretation of text provided within the domain. A prediction domain may include any type of domain, including a clinical domain with various clinical terminologies, a manufacturing domain with various manufacturing terminologies, a computing domain with various computing terminologies, among other. In each domain, the terminology used may impact the meaning of the same text, such that domain-specific language model may outperform generic domain-agnostic language models.

In some embodiments, a private document 404 is a data entity that describes text that is associated with a prediction domain and accessible to an enterprise within the prediction domain. A private document, for example, may include text that is stored by an enterprise in a private repository. In some examples, a private document 404 may be subject to one or more security constraints that restrict access of the private document 404 to an enterprise. By way of example, in a clinical prediction domain, a private document 404 may include clinical notes for a patient that is subject to privacy restrictions.

In some embodiments, an enterprise data partition 406 is a data entity that describes a text segment from a private document 404. An enterprise data partition 406, for example, may include a pretraining text sequence for a language model that is extracted from a private document 404 for an enterprise within a prediction domain. In some examples, a plurality of enterprise data partitions may be generated from a plurality of private documents 404 by splitting the plurality of private documents 404 into a plurality of first non-overlapping text sequences. In some examples, the plurality of private documents 404 may be split according to a predefined sequence length.

In some examples, a plurality of private documents 404 may be segmented into a plurality of enterprise data partitions. As described herein, the plurality of enterprise data partitions may be leveraged to generate a balanced training dataset 416. For example, the plurality of enterprise data partitions may be blended with a plurality of domain-specific data partitions to generate the balanced training dataset 416. In some examples, a balanced training dataset 416 may include a balanced training partition for each of the plurality of enterprise data partitions.

In some embodiments, a domain-specific data partition 412 is received from a plurality of domain-specific data partitions associated with one or more domain data sources 408 that are different than the enterprise data source 402. For example, the one or more domain data sources 408 may include a plurality of public documents 410 that are publicly accessible to a plurality of enterprises within the prediction domain. In some examples, the plurality of domain-specific data partitions 412 include a plurality of second non-overlapping text sequences extracted from the plurality of public documents 410.

In some embodiments, a domain data source 408 is a data source that includes a plurality of public documents 410 for a prediction domain. A domain data source 408 may depend on a prediction domain. For example, a domain data source 408 may include an academic platform, a regulatory platform, a weblog, and/or the like, that provides access to a plurality of public documents 410. A domain data source 408 may provide sets of available public data for pretraining a language model for a prediction domain. By way of example, in a clinical prediction domain, domain data sources 408 may include the PubMed National Library of Medicine platform, a MIMIC clinical database, public clinical practice guidelines, and/or the like.

In some embodiments, the public documents 410 describe text that is associated with a prediction domain and accessible to a plurality of enterprises within the prediction domain.

In some embodiments, a domain-specific data partition 412 is a data entity that describes a text segment from a public document 410. A domain-specific data partition 412, for example, may include a pretraining text sequence for a language model that is extracted from a public document 410 for a prediction domain. In some examples, a plurality of domain-specific data partitions may be generated from a plurality of public documents 410 by splitting the plurality of public documents 410 into a plurality of second non-overlapping text sequences. In some examples, the plurality of public documents may be split according to the predefined sequence length.

For example, the size of the plurality of first non-overlapping text sequences and the plurality of second non-overlapping text sequences is defined by predefined sequence length. The predefined sequence length may be a data constraint that defines a maximum sequence length of a data partition. A predefined sequence length may be a configurable parameter. In some examples, the predefined sequence length may be configured based on a language model. For instance, the predefined sequence length may be set to a maximum input size of a language model.

In some embodiments, the enterprise data partition 406 is stored as an initial training partition 414 of a plurality of balanced training partitions within a balanced training dataset 416. In some examples, the balanced training dataset 416 may include a plurality of balanced training partitions. The plurality of balanced training partitions of the balanced training dataset 416 may respectively correspond to the plurality of enterprise data partitions.

In some embodiments, the initial training partition 414 is a data entity that describes an initially loaded training partition from an enterprise data partition 406 before the training partition is balanced by loading a portion of a domain-specific data partition 412.

In some embodiments, a balanced training partition is generated by appending a portion of the domain-specific data partition 412 to the initial training partition 414. For example, each of the plurality of balanced training partitions of the balanced training dataset 416 may include a respective enterprise data partition 406 and an equal portion of a respective domain-specific data partition 412. In some examples, a size of the portion of the domain-specific data partition 412 is based on a number of the plurality of public documents 410 and/or a number of the plurality of enterprise data partitions 406. In some examples, a partition size of the balanced training partition is defined by a predefined hardware constraint.

In some embodiments, the balanced training partition is a data entity of a balanced training dataset 416. A balanced training partition, for example, may include a data partition that includes at least a portion of an enterprise data partition 406 and at least a portion of a domain-specific data partition 412. In some examples, a balanced training partition may be configured according to a predefined hardware constraint. In some examples, the probability that a given row of a balanced partition is from an enterprise data partition 406 may be equal to a total number of enterprise data partitions divided by a total number of balanced training partitions. In addition, or alternatively, a balanced training partition may have the property that the probability that a row from a balanced training partition is from the domain-specific data partition 412 may be equal to a total number of public documents 410 divided by the total number of balanced training partitions. This may be accomplished by reading all domain-specific data into memory partition by partition and adding an equal amount of each domain-specific data partition 412 to each initial training partition 414 and then shuffling the final partitions. This ensures that enterprise and domain-specific data is uniformly distributed throughout the balanced training dataset 416.

In some embodiments, the predefined hardware constraint is a data constraint that describes a maximum sequence length of a balanced training partition. A predefined hardware constraint may be a configurable parameter. In some examples, the predefined hardware constraint may be configured based on a hard disk partition size.

In some embodiments, the balanced training dataset 416 is a data structure that describes a pretraining dataset for a language model. A balanced training dataset 416, for example, may include a plurality of balanced training partitions that individually balance enterprise and domain-specific data. For instance, a balanced training dataset 416 may include a mix of private document data from an enterprise data source 402 and public document data from domain data sources 408 for pretraining a language model. By doing so, the balanced training dataset 416 may train a language model to learn an enterprise specific language that is rooted in domain terminology.

The balanced training dataset 416 may be generated by combining an enterprise partition dataset (e.g., including a plurality of enterprise data partitions, etc.) with a domain-specific partition dataset (e.g., including a plurality of domain-specific data partitions, etc.) that are initially stored as separate data structures (e.g., a file, a plurality of files per dataset, etc.). The balanced training dataset 416 may be generated by loading and combining enterprise and domain-specific data partitions, partition by partition, and then shuffling the resulting balanced training partitions, such that the balanced training dataset includes parquet partitions.

In some embodiments, each of the plurality of balanced training partitions is stored at an indexed position 418 within the balanced training dataset 416. The balanced training dataset 416 may be modified (e.g., shuffled) by rearranging a plurality of indexed positions 418 of the plurality of balanced training partitions within the balanced training dataset 416. In some examples, the indexed position 418 is a position of the balanced training partition within a balanced training dataset 416. In some examples, the indexed positions 418 of a plurality of balanced training partitions within a balanced training dataset may be modified to shuffle the balanced training dataset 416.

In some embodiments, a domain-specific language model 420 is trained based on the balanced training dataset 416. The domain-specific language model 420, for example, may include a BERT model. The domain-specific language model 420 may be trained using continued masked language modelling based on the balanced training dataset 416. In some examples, a byte-pair encoding subword may be generated for the balanced training dataset 416. The domain-specific language model 420 may be trained based on the byte-pair encoding subword.

In some embodiments, a domain-specific language model 420 is a data entity that describes parameters, hyper-parameters, and/or defined operations of a rules-based and/or machine learning model (e.g., model including at least one of one or more rule-based layers, one or more layers that depend on trained parameters, coefficients, and/or the like). A domain-specific language model 420 may include any type of model configured, trained, and/or the like to generate an encoded output, such as a text embedding (e.g., text segment embedding, prompt embedding, etc.), for a text segment. A domain-specific language model 420 may include one or more of any type of machine learning model including one or more supervised, unsupervised, semi-supervised, reinforcement learning models, and/or the like. For instance, a domain-specific language may include a machine learning language model, such as a bidirectional transformer, that may be trained using a balanced training dataset 416. By way of example, a domain-specific language model 420 may include a bidirectional encoder-based language model, such as a BERT model, a ROBERTa model, and/or the like.

In some embodiments, the domain-specific language model 420 is trained, using the balanced training dataset 416, from random initialization. In some examples, the domain-specific language model 420 may be pretrained and then refined using continued masked language modeling and the balanced training dataset 416. In addition, or alternatively, the domain-specific language model 420 may be initialized as a masked language model and pretrained on the balanced training dataset 416 until convergence via early stopping. In some examples, prior to pretraining the domain-specific language model 420, a tokenizer (e.g., a byte-pair encoding subword, etc.) may be learned to represent the balanced training dataset 416 using the most efficient (e.g., for the given tokenization algorithm) number of subwords for a given vocabulary size (typically 50 k tokens). The tokenizer may be used, with the domain-specific language model 420, to tokenize documents, text segments, prompts, and/or any other text of the present disclosure.

In this way, a domain-specific language model 420 may be trained specifically for encoding text of an enterprise. The domain-specific language model 420 may be used in various machine learning pipelines to encode a semantic meaning of text generated within the enterprise. An operational example of one such pipeline, a multi-modal prediction training pipeline 500, is described further with reference to FIG. 5.

Figure 5:
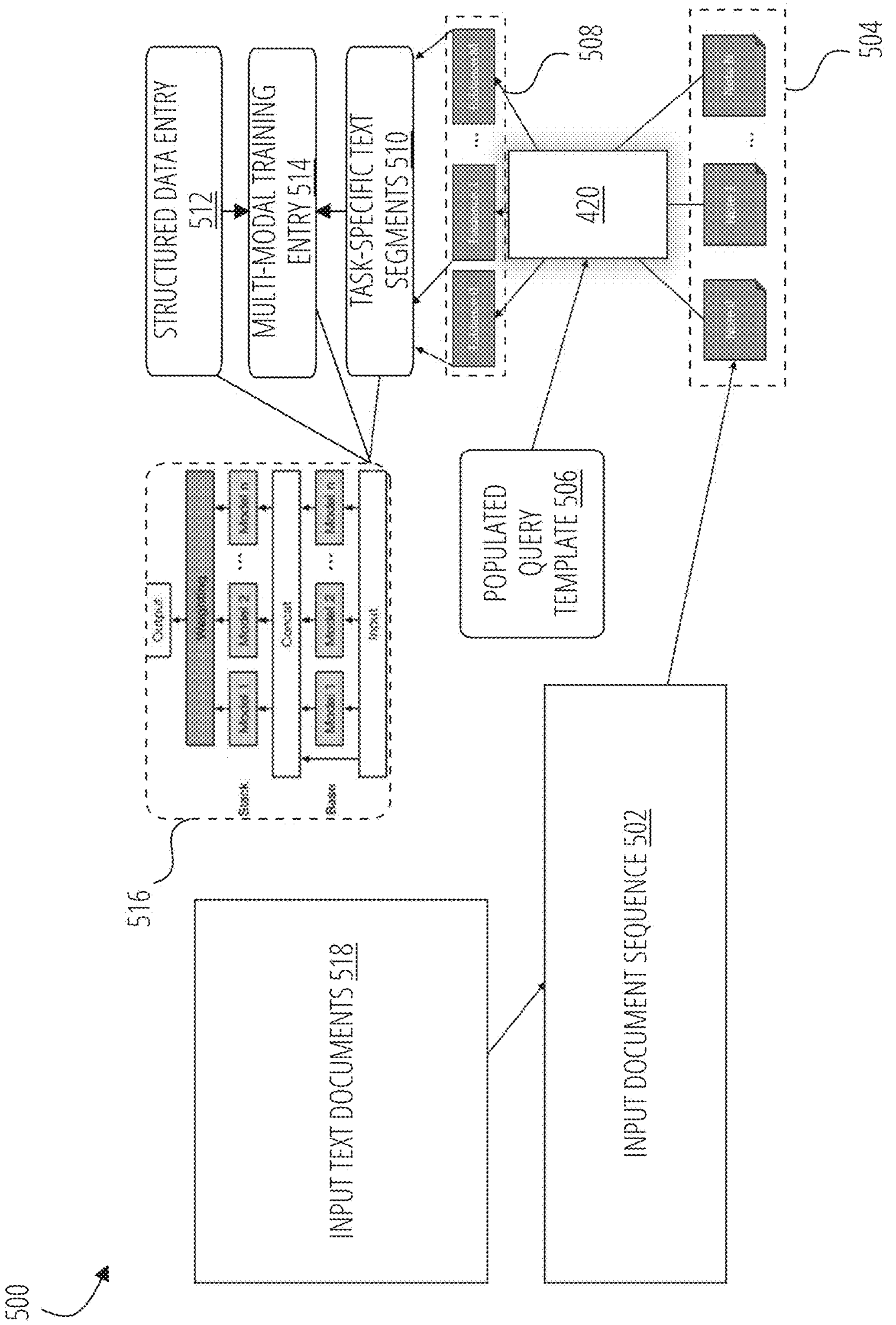
FIG. 5 is an example data flow diagram of a multi-modal prediction training pipeline in accordance with some embodiments discussed herein.

FIG. 5 is an example data flow diagram of a multi-modal prediction training pipeline 500 in accordance with some embodiments discussed herein. The multi-modal prediction training pipeline 500 includes a multi-stage training technique in which a multi-modal training entry 514 is first prepared and then used train a target machine learning model 516. During a first stage, for example, a plurality of input text documents 518 may be processed to extract a plurality of task-specific text segments 510. The task-specific text segments 510 may be extracted using a populated query template 506, in combination with the domain-specific language model 420 of the present disclosure, to identify segments of natural language test that complement, rather than overlap, predictive insight derived from structured data entries 512. In this way, a multi-modal training entry 514 may be generated that intelligently combines both structured data entries 512 and natural language text to improve the predict capabilities of the target machine learning model 516. During the second stage, the target machine learning model 516 may be trained using the multi-modal training entries 514. Thereafter, the stages of the multi-stage training technique may be applied during inference to improve the capabilities of machine learning models with respect to multi-modal data, while reducing the processing and memory usage required by a computer to perform complex predictive tasks by reducing the size and improving the predictiveness of input data for machine learning models.

In some embodiments, a plurality of text segment embeddings is generated for a plurality of text segments 504 of a plurality of input text documents 518 associated with a predictive task. The plurality of text segment embeddings may be generated using the domain-specific language model 420. In some examples, an input document threshold may be identified based on a distribution of documents for a plurality of entities associated with an enterprise. The plurality of input text documents 518 may be received from an enterprise data source based on the input document threshold.

In some embodiments, the plurality of input text documents 518 is respectively associated with a plurality of recordation times. The plurality of text segment embeddings may be generated by generating an input document sequence 502 by sequentially concatenating the plurality of input text documents 518 based on the plurality of recordation times and inputting the input document sequence 502 to the domain-specific language model 420 to generate the plurality of text segment embeddings.

In some embodiments, an input text document 518 is a data entity that describes an input document for a predictive task. In some examples, an input text document 518 may include a private document that is associated with a target entity. The target entity, for example, may be a target of a prediction and the input text document 518 may include text segments that may be predictive of the prediction. By way of example, in a clinical prediction domain, a predictive task may include a disease progression prediction for a patient and the input text document may include a clinical note for the patient.

In some embodiments, a predictive task is an activity within a prediction domain that is configured to generate a prediction. In some examples, a predictive task may include a machine learning process configured to apply one or more machine leaning models to generate the prediction. In some examples, a predictive task may leverage natural language and/or structured text associated with a prediction domain to generate a prediction. In some examples, the natural language and/or structured text may be received from one or more domain and/or enterprise data sources.

In some embodiments, an input document threshold is a data constraint that defines a maximum number of input text documents 518 for a predictive task. An input document threshold, for example, may be a configurable parameter for limiting a number of input text documents 518. In some examples, the input document threshold may limit a number of text documents available for an entity that may be selected as input text documents 518 for a predictive task. For example, the input document threshold may define a maximum number of text documents from a plurality of text documents available for an entity that may be selected for a predictive task. Using the input document threshold, a subset of input text documents 518 from a plurality of text documents for an entity may be selected for analysis during a predictive task. In this manner, the number of text documents available for an entity may be truncated to improve processing speeds for performing the predictive task. In some examples, the input document threshold may be set to a high number of documents to prevent truncating the text documents available for a majority (e.g., 95%, 80%, 51%, etc.) of the plurality of entities, while truncating the text documents available for outlier entities associated with a large number of text documents relative to the remaining plurality of entities. In this way, a number of input text documents 518 considered for a plurality of entities may be standardized using truncation.

In some examples, an input document threshold may be defined based on a number of text documents available for each of a plurality of entities associated with an enterprise. By way of example, the input document threshold may include the threshold percentile (e.g., 95th percentile, etc.) of the number of text documents available for each entity over a feature window. By way of example, input document threshold may be defined by identifying the threshold percentile based on a distribution (e.g., histogram, etc.) of a count of available text documents across each of a plurality of entities. From this distribution, one or more percentiles may be computed that reflect a number of text documents available for a percentage of the plurality of entities. The number of text documents available of the threshold percentile may be identified from the one or more percentiles and used to define the input document threshold.

In some embodiments, a recordation time is a data value that describes a time stamp for an input text document 518. A recordation time, for example, may describe a time at which an input text document 518 in created (e.g., creation time, etc.), a time at which an event associated with an input text document 518 occurs (e.g., an event date, etc.), and/or the like.

In some embodiments, the input document sequence 502 is an input to the domain-specific language model 420. An input document sequence 502, for example, may include a plurality of input text documents 518. For example, the plurality of input text documents 518 may be ordered as a single ordered sequence for inputting to the domain-specific language model 420. In some examples, the plurality of input text documents 518 may be ordered according to a plurality of recordation times respectively associated with the plurality of input text documents 518. By way of example, the input document sequence 502 may include a dataset of a plurality of input text documents 518 ordered by recordation time (e.g., creation time, event date, etc.). As described herein, the input document sequence 502 may be processed by the domain-specific language model 420 to extract a natural language text for one or more downstream models. In some examples, the extracted a natural language text (e.g., task-specific text segments 510, etc.) may be combined with a tabular dataset of structured data entries 512 (e.g., medical records in the form of medical codes, etc.) including a set of codes respectively associated with their own recordation times (e.g., creation time, event date, etc.).

In some embodiments, the text segments 504 describe portions of text from an input document sequence 502. Text segments 504, for example, may include one or more characters, words, and/or sentences extracted from an input document sequence 502 and/or input text document 518 thereof. By way of example, a sentence splitting operation may be performed on the input document sequence 502 to split the input document sequence 502 into a plurality of text segments 504. In some examples, each of the text segments 504 may be compared, using the some of the techniques of the present disclosure, to a populated query template 506 to extract one or more task-specific text segments 510 for a predictive task.

In some embodiments, text segment embeddings are encodings of the text segments 504. A text segment embedding, for example, may include an output of the domain-specific language model 420. The text segment embedding may include a tokenized and embedded text segment from the plurality of text segments 504.

In some embodiments, a plurality of prompt embeddings may be identified that are associated with the predictive task. In some examples, the one or more prompt embeddings may be identified from a plurality of prompt embeddings respectively associated with a plurality of predictive tasks. The one or more prompt embeddings may be generated, using the domain-specific language model 420, based on one or more query text segments at least partially from a populated query template 506.

In some embodiments, a query text segment is a data entity that describes a sequence of text reflective of a prompt for extracting task-specific text segments 510. A query text segment, for example, may include a prompt-based query text segment that is generated based on and/or from the populated query template 506. In addition, or alternatively, a query text segment may include one or more input-based query text segment that are provided as additional and/or alternative conditions to a prompt-based query text segment. An input-based query text segment, for example, may include a query that is not sourced from a populated query template 506. For instance, the input-based query text segment may be manually generated, received based on user feedback, generated through one or more ancillary queries, and/or the like. Each query text segment may include textual phrase, individual predictor words, and/or the like that reflect one or more predictors for a predictive task.

Each query text segment for a predictive task may be designed to extract natural language evidence related to multiple dimensions of a predictive task, while minimizing an overlap with structured data. An example set of queries for a clinical domain may include (1) a prompt-based query text segment: "Predictors of <disease>" where <disease> is replaced with the appropriate Di and/or one or more input-based query text segments (2) "Social determinants of health," (2) "Pain or discomfort," (3) "Clinical information," (4) "Smoking status," (5) "Signs of declining health," and/or the like.

In some embodiments, a prompt embedding is a data entity that describes an encoding of a query text segment. A prompt embedding, for example, may include an output of the domain-specific language model 420. The prompt embedding may include a tokenized and embedded query text segment from one or more query text segments. For example, each of the one or more query text segments may be input to the domain-specific language model 420, which may tokenize and convert each query text segment to a respective prompt embedding using mean pooling or another encoding approach to arrive at one vector per query text segment. The query text segments, once embedded as prompt embeddings, may be used to extract task-specific text segments 510 semantically related to a predictive task from the plurality of text segments. For example, the task-specific text segments 510 may be extracted based on task-specific similarity scores between the prompt embeddings and the text segment embeddings.

In some embodiments, a plurality of task-specific similarity scores is generated for the plurality of text segments 504 based on a comparison between the plurality of text segment embeddings and the plurality of prompt embeddings. For example, a first similarity score may be generated for a text segment based on a comparison between a text segment embedding corresponding to the text segment and a first prompt embedding of the plurality of prompt embeddings. In addition, or alternatively, a second similarity score for the text segment may be generated based on a comparison between the text segment embedding and a second prompt embedding of the plurality of prompt embeddings.

In some embodiments, the task-specific similarity scores are data values that describe a semantic similarity between a query text segment and a text segment. A task-specific similarity score, for example, may be generated for each combination of text segment and query text segment pairs. Each task-specific similarity score may be based on a comparison between a prompt embedding of a query text segment and a text segment embedding of a text segment of a text segment and query text segment pair. The task-specific similarity score may include any type of embedding similarity score, such as a cosine similarity score, and/or the like. In this way, a task-specific similarity score may represent a semantic similarity between a text segment and a query text segment by comparing the contextual representations of each (e.g., the respective embeddings) in embedding space where similar ideas and concepts may be encoded in mathematically similar vectors. As described herein, in some examples, a plurality of task-specific similarity scores may be used to rank each of the plurality of text segments 504 with respect to each of the query text segments. In some examples, the resulting ranked lists 508 may identify sentence-level evidence most predictive of an outcome of interest for a predictive task.

In some embodiments, a plurality of ranked lists 508 is generated for the plurality of text segments 504 based on the plurality of task-specific similarity scores. For example, a first ranked list may be generated based on a comparison between the first similarity score for the text segment and a plurality of first similarity scores for the plurality of text segments 504. In addition, or alternatively, a second ranked list may be generated based on a comparison between the second similarity score for the text segment and a plurality of second similarity scores for the plurality of text segments 504.

In some embodiments, a ranked list 508 is a data structure that describes an ordering of a plurality of text sequences. A ranked list 508, for example, may identify a relative similarity of each of the plurality of text sequences relative to a query text segment. For example, a ranked list 508 may arrange the plurality to text sequences in order of their respective task-specific similarity scores with a particular query text segment. In some examples, a ranked list 508 may be generated for each of one or more query text segments. Each ranked list 508 may arrange the plurality of text segments, based on their task-specific similarity score, in order of their respective similarity to a particular query text segment. For example, a first ranked list may rank the plurality of text segments with respect to a prompt-based query text segment, a second ranked list may rank the plurality of text segments with respect to a first input-based query text segment, and/or the like. In some examples, one or more task-specific text segments 510 may be identified from each of a plurality of ranked lists 508 based on a plurality of significance weights respectively corresponding to the plurality of query text segments of the plurality of ranked lists 508 and threshold evidence limit.

In some embodiments, a set of task-specific text segments 510 is identified from the plurality of text segments based on the plurality of task-specific similarity scores. In some examples, the prompt embeddings may be associated with a plurality of significance weights. For example, the first prompt embedding may be associated with a first significance weight and the second prompt embedding may be associated with a second significance weight. In some examples, a first subset of the set of task-specific text segments 510 may be identifier from the first ranked list based on the first significance weight and a threshold evidence limit. In addition, or alternatively, a second subset of the set of task-specific text segments 510 may be identified from the second ranked list based on the second significance weight and the threshold evidence limit. In some examples, the set of task-specific text segments 510 may be generated by removing one or more duplicate task-specific text-segments from an initial set of candidate task-specific text segments.

In some embodiments, a significance weight is a data parameter that defines a relative significance of a query text segment. A significant weight may be a configurable parameter that defines a number of task-specific text segments 510 (and/or proportion of a threshold evidence limit) that may be selected from a ranked list 508 corresponding to a particular query text segment. By way of example, a first significance weight for a prompt-based query text segment corresponding to a first ranked list may indicate a first number of task-specific text segments (e.g., 40, 40% of a threshold evidence limit, etc.) that may be selected from the first ranked list as task-specific text segments 510. A second significance weight for an input-based query text segment corresponding to a second ranked list may indicate a second number of task-specific text segments (e.g., 20, 20% of a threshold evidence limit, etc.) that may be selected from the second ranked list as task-specific text segments 510.

Other examples may include a third significance weight identifying a third number of task-specific text segments (e.g., 10, 10% of a threshold evidence limit, etc.) that may be selected from the third ranked list, a fourth significance weight identifying a fourth number of task-specific text segments (e.g., 10, 10% of a threshold evidence limit, etc.) that may be selected from the fourth ranked list, a fifth significance weight identifying a fifth number of task-specific text segments (e.g., 10, 10% of a threshold evidence limit, etc.) that may be selected from the fifth ranked list, a sixth significance weight identifying a sixth number of task-specific text segments (e.g., 5, 5% of a threshold evidence limit, etc.) that may be selected from the sixth ranked list, and/or a seventh significance weight identifying a seventh number of task-specific text segments (e.g., 5, 5% of a threshold evidence limit, etc.) that may be selected from the seventh ranked list.

Any number and/or distribution of significance weights may be applied to a plurality of query text segments to optimize a performance of a target machine learning model 516. The significance weights may be predetermined. In addition, or alternatively, the significance weights may be dynamically configured based on a performance of the target machine learning model 516.

In some embodiments, the task-specific text segments 510 are natural language text segments that are selected as input to a target machine learning model 516. A task-specific text segment 510, for example, may include a natural language sequence of text that is predetermined to have a predictive impact on a prediction of a target machine learning model 516. In some examples, a plurality of task-specific text segments 510 may be selected from a plurality of ranked lists 508 respectively corresponding to a plurality of query text segments based on a plurality of significance weights respectively corresponding to the plurality of query text segments and a threshold evidence limit.

In some embodiments, a threshold evidence limit is a data constraint that defines a maximum number of task-specific text segments 510 for a predictive task. A threshold evidence limit, for example, may be a configurable parameter that may constrain a natural language input size of a multi-modal input to a target machine learning model. In some examples, the threshold evidence limit may include one or more hyperparameters that are optimized in an end-to-end fashion using random or Bayesian grid search.

In some embodiments, a threshold evidence limit includes a selection limit and an input limit. A selection limit may define an initial number of candidate task-specific text segments selected from a plurality of ranked lists 508. In some examples, a selection limit may be initially defined as a total of 100 task-specific text segments and optimized from the initial total. In some examples, the initial number of candidate task-specific text segments may be deduplicated to remove one or more redundant candidate text segments from the initial number of candidate task-specific text segments. The remaining number of candidate task-specific text segments may be filtered based on the input limit.

An input limit may define a standardized number of task-specific text segments 510 for input to a target machine learning model 516. In some examples, the input limit may be defined based on the remaining number of candidate task-specific text segments available for each of a plurality of entities associated with an enterprise. By way of example, the input limit may include the threshold percentile (e.g., 95th percentile, etc.) of the remaining number of candidate task-specific text segments available for each of a plurality of entities. By way of example, the threshold percentile in terms of the number of remaining candidate task-specific text segments produced for each entity in a training dataset may be identified as the input limit.

In some examples, the remaining number of candidate task-specific text segments may be truncated to the number of task-specific text segments 510 defined by the input limit.

In some embodiments, a target machine learning model 516 is trained based on the one or more task-specific text segments 510. For example, the one or more task-specific text segments 510 may be associated with a training entity. One or more structured data entries 512 may be received that are associated with the training entity. A multi-modal training entry may be generated by merging the one or more structured data entries 512 with the one or more task-specific text segments 510. The multi-modal training entry 514 may be input to the target machine learning model 516 to receive a training output and one or more parameters of the target machine learning model 516 may be updated based on a comparison between the training output and a training label.

In some embodiments, the target machine learning model 516 is a data entity that describes parameters, hyper-parameters, and/or defined operations of a rules-based and/or machine learning model (e.g., model including at least one of one or more rule-based layers, one or more layers that depend on trained parameters, coefficients, and/or the like). A target machine learning model 516 may include any type of model configured, trained, and/or the like to generate a predictive output for a predictive task. A target machine learning model 516 may include one or more of any type of machine learning model including one or more supervised, unsupervised, semi-supervised, reinforcement learning models, and/or the like. In some examples, the target machine learning model 516 may include a plurality of machine learning models.

In some embodiments, a target machine learning model 516 is a stacked ensemble model configured to combine natural language text inputs with structured inputs. For instance, the target machine learning model 516 may include a stacked ensemble classification model. The stacked ensemble classification model may receive a multi-modal input entry. The multi-modal input entry may include a task-specific text sequence that combines a plurality of task-specific text segments 510 based on their task-specific similarity scores. In addition, the multi-modal input entry may include structured data (e.g., structured data entries 512) for an entity corresponding to the task-specific text sequence. The target machine learning model 516 may include a plurality of machine learning classifiers (e.g., neural network layers, regression networks, branching decision trees, and/or any other classifier architecture) respectively configured to generate a plurality of sub-predictions for a predictive task based on the task-specific text sequence, the structured data, and/or both.

The target machine learning model 516 may be configured to provide one or more portions of the multi-modal input entry to each of the plurality of machine learning classifiers and receive a plurality of sub-predictions from the plurality of machine learning classifiers. The target machine learning model 516 may be trained to combine the plurality of sub-predictions, using a meta-classifier, with weights learned on out-of-fold data. By way of example, the target machine learning model 516 may be trained using a framework such as AutoGluon to handle the overhead associated with managing out-of-fold predictions to avoid overfitting.

In some examples, a target machine learning model 516 may include a stacked ensemble architecture to improve performance on multi-modal data, including natural language text sequences and structured data. The stacked ensemble architecture, for example, may provide multiple opportunities for interactions between the text and structured input modalities of a multi-modal input entry. In some examples, a meta-classifier of the target machine learning model 516 may be trained to learns weights for the plurality of sub-predictions from the plurality of machine learning classifiers. In this manner, the meta-classifier may combine multiple sub-predictions from multiple models and data sources to generate a prediction output.

The target machine learning model 516 (e.g., meta-classifier and/or the plurality of classifier models) may be trained, using supervisory training techniques, based on a labeled training dataset for a predicted task. By way of example, a labeled training dataset may include a plurality of multi-modal training entries 514 respectively associated with a plurality of training entities. The target machine learning model 516 may be trained to optimize a performance of the model with respect to a plurality of training labels respectively corresponding to the plurality of training entries. In some examples, the meta-classifier and/or the plurality of classifier models may be trained end-to-end. In addition, or alternatively, the meta-classifier and/or the plurality of classifier models may be trained in one or more stages. For example, the plurality of classifier models may be pretrained and/or trained in a first training stage and the meta-classifier may be trained in a second stage after freezing the weights of the plurality of classifier models.

In some embodiments, the multi-modal training entry 514 is a data entity that describes a training input for a target machine learning model 516. A multi-modal training entry 514 may include a natural language portion and a structured language portion.

The natural language portion may include a task-specific text sequence that combines a plurality of task-specific text segments 510 based on their task-specific similarity scores. In some examples, text features of the plurality of task-specific text segments 510 may be represented as N-Gram features over phrases of text and/or encoded using Term Frequency Inverse Document Frequency and/or as text embeddings using the domain-specific language model 420.

A structured language portion may include one or more structured data entries 512. A structured data entry 512, for example, may include a structured code (e.g., a medical code in a clinical domain, etc.) that is defined within a prediction domain. In some examples, a training entity may be associated with a structured history that identifies a plurality of structured data entries 512 for the training entity. In some examples, the structured data entries 512 may be represented as a vector of one-hot encoded features.

In some embodiments, a training entity is a data entity that describes an entry of a training dataset. A training entity may be any entity that is associated with natural language and/or structured text. By way of example, in a clinical domain, a training entity may be a patient that is associated with a plurality of clinical notes (e.g., natural language text) and/or a clinical history (e.g., structured text).

In some embodiments, the training label is a data entity that describes a ground truth for a training entity. A training label, for example, may include a recorded outcome for a training entity that identifies a desired result of a prediction for a predictive task. The training label may include a binary value, a continuous value, a value range, and/or the like. By way of example, a training label may include a binary value indicating whether an event occurred within a time period. As a clinical example, a training label may include a binary value indicative of a disease onset and/or a level of progression of a disease in a time period.

In some embodiments, a training output is an output of a target machine learning model 516. A training output, for example, may include a prediction output for a predictive task. The training output may include a binary value, a continuous value, a value range, and/or the like. By way of example, a training output may include a probability estimate for a target prediction. As a clinical example, a training output may include a probability estimate for disease onset or progression in the next N years (e.g., N=1).

In this manner, some of the techniques of the present disclosure may leverage query text segments at least partially derived from reusable populated query templates 506 to generate highly predictive training inputs for a target machine learning model 516. As described herein, these techniques may be applied during a training phase of the target machine learning model 516 to improve the predictive performance of the model, while reducing the processing resources and memory allocations required to train the model by filtering the training data for the model. These techniques may also be applied during inference to improve the predictive capabilities of the target machine learning model 516 without devoting addition processing resources to a predictive task. Thus, the populated query template 506 may improve both the training and use of a target machine learning model 516. An example populated query template 506 is discussed in further detail with reference to FIG. 6.

Figure 6:
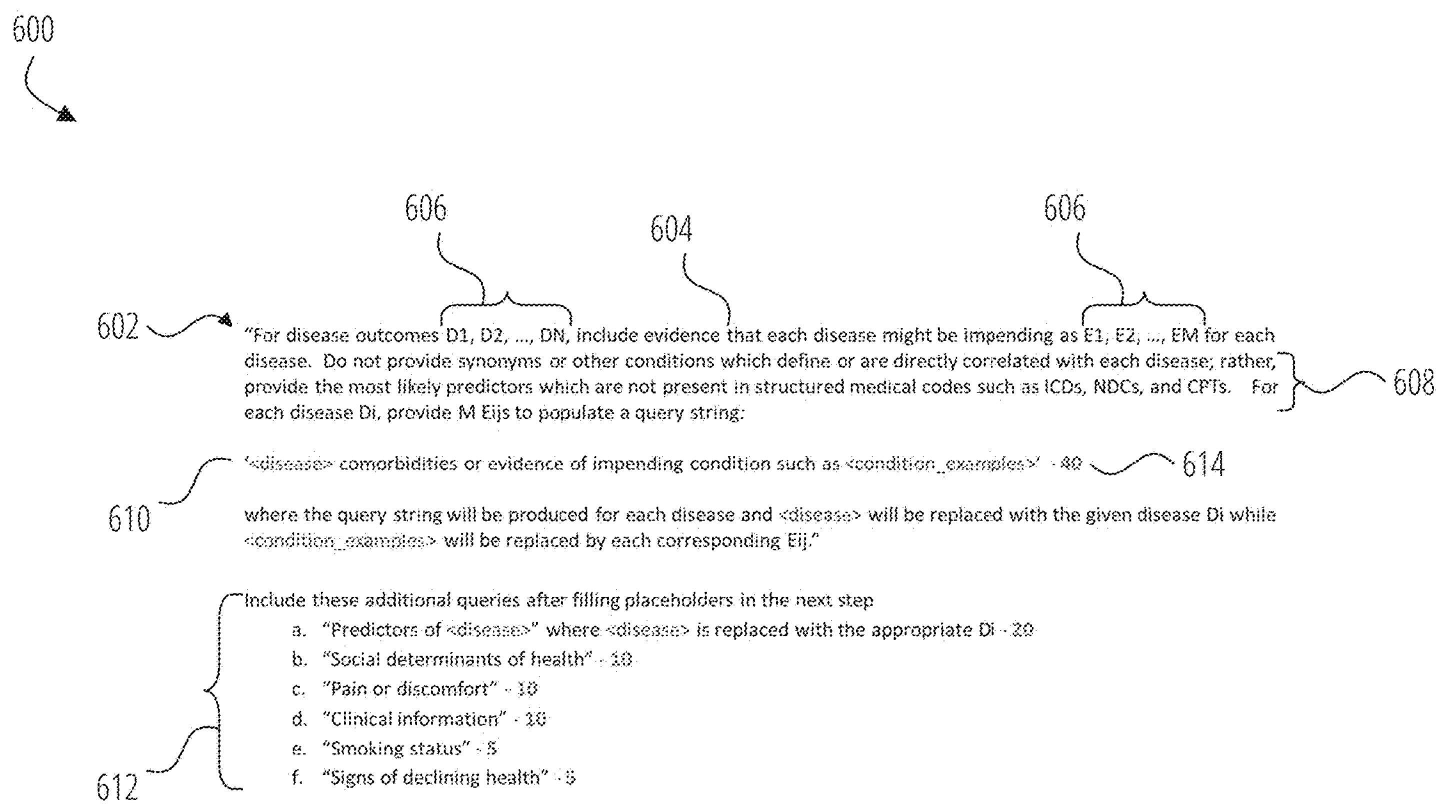
FIG. 6 is an operational example of a populated query template in accordance with some embodiments discussed herein.

FIG. 6 is an operational example 600 of a populated query template in accordance with some embodiments discussed herein. The operational example 600 shows the components of a query template 602, including a text template 604, a modifiable template section 606, and/or population instructions 608. As depicted, a populated query template may include a query template 602 with one or more updated modifiable template sections that may form a prompt-based query text segment 610. In addition, or alternatively, the populated query template may include a plurality of input-based query text segment 612.

In some embodiments, the populated query template 506 includes a text template 604 with one or more modifiable template sections 606 and one or more population instructions 608 configured to modify the one or more modifiable template sections 606 based on a predictive task. A query text segment of the one or more query text segments may include a portion of the text template 604 with an updated modifiable template section. The one or more population instructions 608, for example, may restrict the one or more modifiable template sections 606 to complementary data relative to a plurality of structured data entries associated with the predictive task in some examples, the one or more population instructions 608 may include one or more automated queries to one or more domain-specific data sources.

In some embodiments, the query template 602 is a data entity that describes a template for constructing a prompt. A query template, for example, may include a text template 604, one or more modifiable template sections 606, and/or population instructions 608. The text template 604 may include predefined text that describes one or more task-agnostic portions of the prompt. The one or more modifiable template sections 606 may include modifiable text that describe one or more task-specific portions of the prompt. The text template 604 with the one or more modifiable template sections 606 enables a user to adapt one template for any of a plurality of predictive tasks within a prediction domain. In some examples, the population instruction 608 may help a user (and/or automated agent) modify the one or more modifiable template sections 606. By way of example, a query template 602 for a clinical domain may include additional population instructions 608, such as 'Imagine you are google searching over all the clinical notes written for a patient to extract some information which isn't obviously present in the claims record,' and/or the like, to help a user and/or automated agent populate the modifiable template sections 606 of the query template.

A user (and/or automated agent) may adapt the query template 602 to a predictive task by providing task-specific information specific to the predictive task. In some examples, the population instructions 608 may guide a user to provide the task-specific information. In addition, or alternatively, a query template 602 may be populated using an automated agent. For example, the population instructions 608 may include one or more automated queries (e.g., to one or more public data sources, etc.) to receive the task-specific information for populating the query template. By way of example, a query template 602 may be given to a user (e.g., a clinical annotator, etc.) and/or an automated agent (e.g., a query system, generative language model, etc.) as an instruction to complete one or more modifiable template sections 606 of the query template 602 to generate a populated query template 506.

In some embodiments, the populated query template 506 is a query template 602 with one or more completed modifiable template sections. A populated query template 506, for example, may be generated by updating one or more modifiable template sections 606 of a query template 602. In some examples, once a populated query template 506 is populated, the populated query template 506 may be reusable for the predictive task. In some examples, the populated query template 506 may be adjusted based on a performance of the predictive task.

Figure 7:
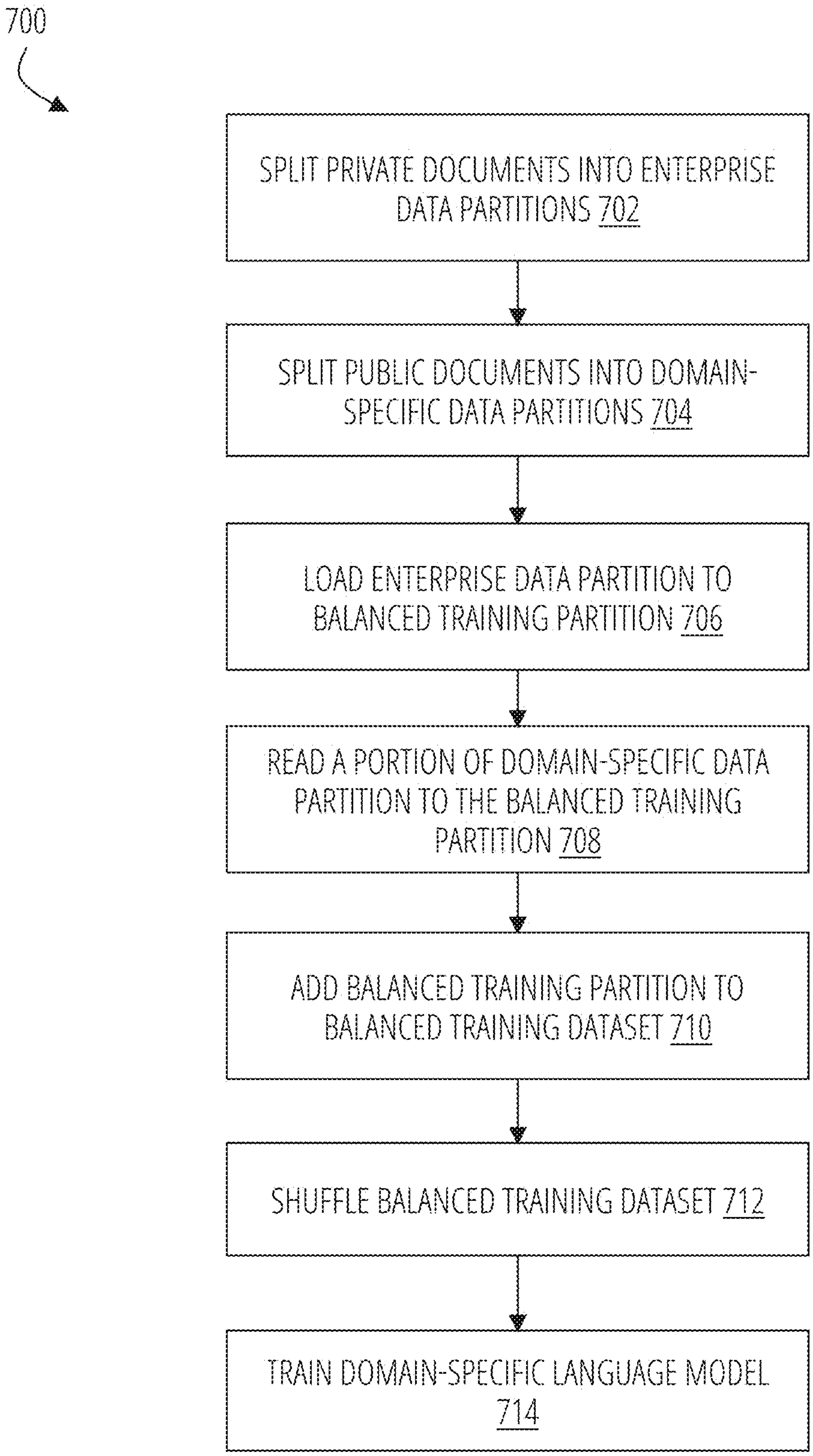
FIG. 7 is a flowchart diagram of a language model training process in accordance with some embodiments discussed herein.

FIG. 7 is a flowchart diagram of a language model training process 700 in accordance with some embodiments discussed herein. The flowchart depicts a data blending and training process 700 for generating improved domain-specific language models. The process 700 may be implemented by one or more computing devices, entities, and/or systems described herein. For example, via the various steps/operations of the process 700, the computing system 101 may leverage an improved data blending techniques to generate a blended training dataset to preserve the privacy of enterprise-level data, while incorporating enterprise-level language insights to a training process. By doing so, the process 700 facilitates new language model training techniques that improve the performance of language models relative to traditional approaches.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some embodiments, the process 700 includes, at step/operation 702, splitting private documents into enterprise data partitions. For example, the computing system 101 may receive an enterprise data partition from a plurality of enterprise data partitions associated with an enterprise data source. The enterprise data source may include a plurality of private documents accessible to an enterprise within a prediction domain. In some examples, the plurality of enterprise data partitions includes a plurality of first non-overlapping text sequences extracted from the plurality of private documents.

In some embodiments, the process 700 includes, at step/operation 704, splitting public documents into domain-specific data partitions. For example, the computing system 101 may receive a domain-specific data partition from a plurality of domain-specific data partitions associated with one or more domain data sources that are different than the enterprise data source. The one or more domain data sources may include a plurality of public documents that are publicly accessible to a plurality of enterprises within the prediction domain. In some examples, the plurality of domain-specific data partitions includes a plurality of second non-overlapping text sequences extracted from the plurality of public documents. In some examples, a size of the plurality of first non-overlapping text sequences and the plurality of second non-overlapping text sequences is defined by predefined sequence length.

In some embodiments, the process 700 includes, at step/operation 706, loading enterprise data partition to a balanced training partition. For example, a computing system 101 may store the enterprise data partition as an initial training partition of a plurality of balanced training partitions within a balanced training dataset.

In some embodiments, the process 700 includes, at step/operation 708, reading a portion of a domain-specific data partition to the balanced training partition. For example, the computing system 101 may generate a balanced training partition by appending a portion of the domain-specific data partition to the initial training partition. In some examples, the size of the portion of the domain-specific data partition may be based on a number of the plurality of public documents and/or a number of the plurality of enterprise data partitions. In some examples, a partition size of the balanced training partition may be defined by a predefined hardware constraint.

In some embodiments, the process 700 includes, at step/operation 710, adding the balanced training partition to a balanced training dataset. For example, the computing system 101 may add a balanced training partition to the balanced training dataset for each enterprise data partition of the plurality of enterprise data partitions. The plurality of balanced training partitions of the balanced training dataset, for example, may respectively correspond to the plurality of enterprise data partitions. In some examples, each of the plurality of balanced training partitions may include a respective enterprise data partition and an equal portion of a respective domain-specific data partition.

In some embodiments, the process 700 includes, at step/operation 712, shuffling the balanced training dataset. For example, each of the plurality of balanced training partitions is stored at an indexed position within the balanced training dataset. The computing system 101 may modifying the balanced training dataset by rearranging a plurality of indexed positions of the plurality of balanced training partitions within the balanced training dataset.

In some embodiments, the process 700 includes, at step/operation 714, training domain-specific language model. For example, the computing system 101 may train the domain-specific language model based on the balanced training dataset. In some examples, the domain-specific language model may include a bidirectional encoder representation from transformers model. The domain-specific language model may be trained using continued masked language modelling based on the balanced training dataset.

In some embodiments, the computing system 101 generates a byte-pair encoding subword for the balanced training dataset and trains the domain-specific language model based on the byte-pair encoding subword.

Figure 8:
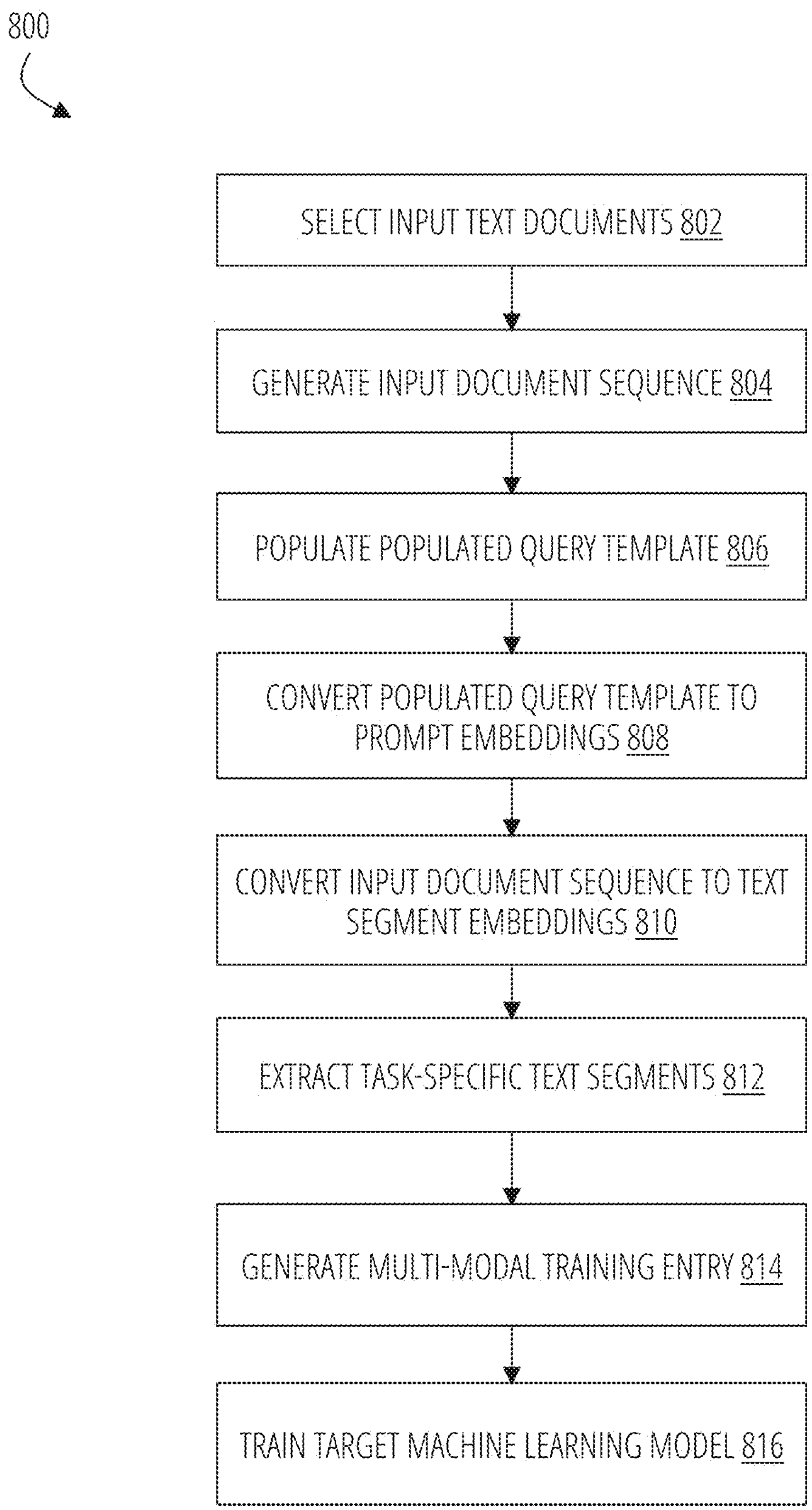
FIG. 8 is a flowchart diagram of a multi-modal prediction training process in accordance with some embodiments discussed herein.

FIG. 8 is a flowchart diagram of a multi-modal prediction training process 800 in accordance with some embodiments discussed herein. The flowchart depicts a multi-stage training process 800 for generating a task-specific multi-modal input and training a model using the input. The process 800 may be implemented by one or more computing devices, entities, and/or systems described herein. For example, via the various steps/operations of the process 800, the computing system 101 may leverage new text extraction techniques to interpret, identify, and filter out highly predictive text sequences from long form text. By doing so, the process 800 facilitates the creation of predictive and size constrained multi-model inputs to addressing technical challenges unique to machine learning technology.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some embodiments, the process 800 includes, at step/operation 802, selecting input text documents. For example, the computing system 101 may identify an input document threshold based on a distribution of documents for a plurality of entities associated with an enterprise. The computing system 101 may receive the plurality of input text documents from an enterprise data source based on the input document threshold.

In some embodiments, the process 800 includes, at step/operation 804, generating an input document sequence. For example, the plurality of input text documents may be respectively associated with a plurality of recordation times. The computing system 101 may generate the input document sequence by sequentially concatenating the plurality of input text documents based on the plurality of recordation times.

In some embodiments, the process 800 includes, at step/operation 806, populating a populated query template. For example, the computing system 101 may provide a query template to a user and/or automated agent. The user and/or automated agent may interact with the query template, in accordance with one or more population instructions, to populate the query template with task-specific information.

In some examples, the populated query template may include a text template with one or more modifiable template sections and/or one or more population instructions configured to modify the one or more modifiable template sections based on the predictive task. A query text segment of the one or more query text segments may include a portion of the text template with an updated modifiable template section. The one or more population instructions may restrict the one or more modifiable template sections to complementary data relative to a plurality of structured data entries associated with the predictive task. In some examples, the one or more population instructions may include one or more automated queries to one or more domain-specific data sources.

In some embodiments, the process 800 includes, at step/operation 808, converting the populated query template to prompt embeddings. For example, the computing system 101 may identify a plurality of prompt embeddings associated with the predictive task. The one or more prompt embeddings may be identified from a plurality of prompt embeddings respectively associated with a plurality of predictive tasks. In some examples, the one or more prompt embeddings may be generated, using the domain-specific language model, based on one or more query text segments from a populated query template.

In some embodiments, the process 800 includes, at step/operation 810, converting the input document sequence to text segment embeddings. For example, the computing system 101 may generate, using a domain-specific language model, a plurality of text segment embeddings for a plurality of text segments of a plurality of input text documents associated with a predictive task. For instance, the computing system may input the input document sequence to the domain-specific language model to generate the plurality of text segment embeddings.

In some embodiments, the process 800 includes, at step/operation 812, extracting task-specific text segments. For example, the computing system 101 may generate a plurality of task-specific similarity scores for the plurality of text segments based on a comparison between the plurality of text segment embeddings and the plurality of prompt embeddings. The computing system 101 may identify a set of task-specific text segments from the plurality of text segments based on the plurality of task-specific similarity scores.

In some examples, the computing system 101 may generate a first similarity score for a text segment based on a comparison between a text segment embedding corresponding to the text segment and a first prompt embedding of the plurality of prompt embeddings. The computing system 101 may also generate a second similarity score for the text segment based on a comparison between the text segment embedding and a second prompt embedding of the plurality of prompt embeddings. In some examples, the computing system 101 may generate a first ranked list based on a comparison between the first similarity score for the text segment and a plurality of first similarity scores for the plurality of text segments and generate a second ranked list based on a comparison between the second similarity score for the text segment and a plurality of second similarity scores for the plurality of text segments.

In some examples, the first prompt embedding is associated with a first significance weight and the second prompt embedding is associated with a second significance weight. The computing system may identify a first subset of the set of task-specific text segments from the first ranked list based on the first significance weight and a threshold evidence limit and identify a second subset of the set of task-specific text segments from the second ranked list based on the second significance weight and the threshold evidence limit. The computing system 101 may remove one or more duplicate task-specific text-segments from the set of task-specific text segments.

In some embodiments, the process 800 includes, at step/operation 814, generating multi-modal training entry. For example, the one or more task-specific text segments may be associated with a training entity. The computing system 101 may receive one or more structured data entries associated with the training entity and generate a multi-modal training entry by merging the one or more structured data entries with the one or more task-specific text segments.

In some embodiments, the process 800 includes, at step/operation 816, training target machine learning model. For example, the computing system 101 may train the target machine learning model based on the one or more task-specific text segments. For instance, the computing system 101 may input the multi-modal training entry to the target machine learning model to receive a training output and update the one or more parameters of the target machine learning model based on a comparison between the training output and a training label.

Some techniques of the present disclosure enable the generation of action outputs that may be performed to initiate one or more real world actions to achieve real-world effects. The techniques of the present disclosure may be used, applied, and/or otherwise leveraged to generate a prediction output that may be leveraged to initiate a control of a device via one or more control instructions, and/or the like. Using some of the techniques of the present disclosure, a prediction output may be interpreted to trigger the performance of actions at a client device, such as the display, transmission, and/or the like of data reflective of a machine learning performance, and/or the like. In some embodiments, a prediction output triggers an alert for a user. In addition, or alternatively, the prediction output may trigger (e.g., via one or more control instructions) an action by a robotic device (e.g., by unlocking an ingress/egress point of a building, etc.).

In some examples, the computing tasks may include actions that may be based on a prediction domain. A prediction domain may include any environment in which computing systems may be applied to interpret, store, and process data and initiate the performance of computing tasks responsive to the data. These actions may cause real-world changes, for example, by controlling a hardware component, providing alerts, interactive actions, and/or the like. For instance, actions may include the initiation of automated instructions across and between devices, automated notifications, automated scheduling operations, automated precautionary actions, automated security actions, automated data processing actions, and/or the like.

VI. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Some embodiments of the present disclosure may be implemented by one or more computing devices, entities, and/or systems described herein to perform one or more example operations, such as those outlined below. The examples are provided for explanatory purposes. Although the examples outline a particular sequence of steps/operations, each sequence may be altered without departing from the scope of the present disclosure. For example, some of the steps/operations may be performed in parallel or in a different sequence that does not materially impact the function of the various examples. In other examples, different components of an example device or system that implements a particular example may perform functions at substantially the same time or in a specific sequence.

Moreover, although the examples may outline a system or computing entity with respect to one or more steps/operations, each step/operation may be performed by any one or combination of computing devices, entities, and/or systems described herein. For example, a computing system may include a single computing entity that is configured to perform all of the steps/operations of a particular example. In addition, or alternatively, a computing system may include multiple dedicated computing entities that are respectively configured to perform one or more of the steps/operations of a particular example. By way of example, the multiple dedicated computing entities may coordinate to perform all of the steps/operations of a particular example.

Example 1. A computer-implemented method comprising generating, by one or more processors and using a domain-specific language model, a plurality of text segment embeddings for a plurality of text segments of a plurality of input text documents associated with a predictive task; identifying, by the one or more processors, one or more prompt embeddings associated with the predictive task; generating, by the one or more processors, a plurality of task-specific similarity scores for the plurality of text segments based on a comparison between the plurality of text segment embeddings and the one or more prompt embeddings; identifying, by the one or more processors, a set of task-specific text segments from the plurality of text segments based on the plurality of task-specific similarity scores; and training, by the one or more processors, a target machine learning model based on the set of task-specific text segments.

Example 2. The computer-implemented method of example 1, further comprising identifying an input document threshold based on a distribution of documents for a plurality of entities associated with an enterprise; and receiving the plurality of input text documents from an enterprise data source based on the input document threshold.

Example 3. The computer-implemented method of any of the preceding examples, wherein the plurality of input text documents is respectively associated with a plurality of recordation times and generating the plurality of text segment embeddings comprises generating an input document sequence by sequentially concatenating the plurality of input text documents based on the plurality of recordation times; and inputting the input document sequence to the domain-specific language model to generate the plurality of text segment embeddings.

Example 4. The computer-implemented method of any of the preceding examples, wherein the one or more prompt embeddings are identified from a plurality of prompt embeddings respectively associated with a plurality of predictive tasks.

Example 5. The computer-implemented method of any of the preceding examples, wherein the one or more prompt embeddings are generated, using the domain-specific language model, based on one or more query text segments from a populated query template.

Example 6. The computer-implemented method of example 5, wherein the populated query template comprises a text template with one or more modifiable template sections and one or more population instructions configured to modify the one or more modifiable template sections based on the predictive task.

Example 7. The computer-implemented method of example 6, wherein a query text segment of the one or more query text segments comprises a portion of the text template with an updated modifiable template section.

Example 8. The computer-implemented method of any of examples 6 through 7, wherein the one or more population instructions restrict the one or more modifiable template sections to complementary data relative to a plurality of structured data entries associated with the predictive task.

Example 9. The computer-implemented method of any of examples 6 through 8, wherein the one or more population instructions comprise one or more automated queries to one or more domain-specific data sources.

Example 10. The computer-implemented method of any of the preceding examples, wherein generating the plurality of task-specific similarity scores for the plurality of text segments comprises generating a first similarity score for a text segment based on a comparison between a text segment embedding corresponding to the text segment and a first prompt embedding of the one or more prompt embeddings; generating a second similarity score for the text segment based on a comparison between the text segment embedding and a second prompt embedding of the one or more prompt embeddings; generating a first ranked list based on a comparison between the first similarity score for the text segment and a plurality of first similarity scores for the plurality of text segments; and generating a second ranked list based on a comparison between the second similarity score for the text segment and a plurality of second similarity scores for the plurality of text segments.

Example 11. The computer-implemented method of example 10, wherein the first prompt embedding is associated with a first significance weight and the second prompt embedding is associated with a second significance weight and identifying the set of task-specific text segments comprises identifying a first subset of the set of task-specific text segments from the first ranked list based on the first significance weight and a threshold evidence limit; identifying a second subset of the set of task-specific text segments from the second ranked list based on the second significance weight and the threshold evidence limit; and removing one or more duplicate task-specific text-segments from the set of task-specific text segments.

Example 12. The computer-implemented method of any of the preceding examples, wherein the set of task-specific text segments are associated with a training entity and training the target machine learning model comprises receiving one or more structured data entries associated with the training entity; generating a multi-modal training entry by merging the one or more structured data entries with the set of task-specific text segments; inputting the multi-modal training entry to the target machine learning model to receive a training output; and updating one or more parameters of the target machine learning model based on a comparison between the training output and a training label.

Example 13. A system comprising memory and one or more processors communicatively coupled to the memory, the one or more processors configured to generate, using a domain-specific language model, a plurality of text segment embeddings for a plurality of text segments of a plurality of input text documents associated with a predictive task; identify one or more prompt embeddings associated with the predictive task; generate a plurality of task-specific similarity scores for the plurality of text segments based on a comparison between the plurality of text segment embeddings and the one or more prompt embeddings; identify a set of task-specific text segments from the plurality of text segments based on the plurality of task-specific similarity scores; and train target machine learning model based on the set of task-specific text segments.

Example 14. The system of example 13, wherein the one or more processors are further configured to identify an input document threshold based on a distribution of documents for a plurality of entities associated with an enterprise; and receive the plurality of input text documents from an enterprise data source based on the input document threshold.

Example 15. The system of any of examples 13 through 14, wherein the plurality of input text documents is respectively associated with a plurality of recordation times and generating the plurality of text segment embeddings comprises generating an input document sequence by sequentially concatenating the plurality of input text documents based on the plurality of recordation times; and inputting the input document sequence to the domain-specific language model to generate the plurality of text segment embeddings.

Example 16. The system of any of examples 13 through 15, wherein the one or more prompt embeddings are identified from a plurality of prompt embeddings respectively associated with a plurality of predictive tasks.

Example 17. The system of any of examples 13 through 16, wherein the one or more prompt embeddings are generated, using the domain-specific language model, based on one or more query text segments from a populated query template.

Example 18. The system of example 17, wherein the populated query template comprises a text template with one or more modifiable template sections and one or more population instructions configured to modify the one or more modifiable template sections based on the predictive task.

Example 19. The system of example 18, wherein a query text segment of the one or more query text segments comprises a portion of the text template with an updated modifiable template section.

Example 20. One or more non-transitory computer-readable storage media including instructions that, when executed by one or more processors, cause the one or more processors to generate, using a domain-specific language model, a plurality of text segment embeddings for a plurality of text segments of a plurality of input text documents associated with a predictive task; identify one or more prompt embeddings associated with the predictive task; generate a plurality of task-specific similarity scores for the plurality of text segments based on a comparison between the plurality of text segment embeddings and the one or more prompt embeddings; identify a set of task-specific text segments from the plurality of text segments based on the plurality of task-specific similarity scores; and train target machine learning model based on the set of task-specific text segments.

The invention claimed is:

1. A computer-implemented method comprising:

generating, by one or more processors and using a domain-specific language model, a plurality of text segment embeddings for a plurality of text segments of a plurality of input text documents associated with a predictive task;

identifying, by the one or more processors, one or more prompt embeddings associated with the predictive task;

generating, by the one or more processors, a plurality of task-specific similarity scores for the plurality of text segments based on a comparison between the plurality of text segment embeddings and the one or more prompt embeddings;

identifying, by the one or more processors, a set of task-specific text segments from the plurality of text segments based on the plurality of task-specific similarity scores; and training, by the one or more processors, a target machine learning model based on the set of task-specific text segments.

2. The computer-implemented method of claim 1, further comprising:

identifying an input document threshold based on a distribution of documents for a plurality of entities associated with an enterprise; and receiving the plurality of input text documents from an enterprise data source based on the input document threshold.

3. The computer-implemented method of claim 1, wherein the plurality of input text documents is respectively associated with a plurality of recordation times and generating the plurality of text segment embeddings comprises:

generating an input document sequence by sequentially concatenating the plurality of input text documents based on the plurality of recordation times; and inputting the input document sequence to the domain-specific language model to generate the plurality of text segment embeddings.

4. The computer-implemented method of claim 1, wherein the one or more prompt embeddings are identified from a plurality of prompt embeddings respectively associated with a plurality of predictive tasks.

5. The computer-implemented method of claim 1, wherein the one or more prompt embeddings are generated, using the domain-specific language model, based on one or more query text segments from a populated query template.

6. The computer-implemented method of claim 5, wherein the populated query template comprises a text template with one or more modifiable template sections and one or more population instructions configured to modify the one or more modifiable template sections based on the predictive task.

7. The computer-implemented method of claim 6, wherein a query text segment of the one or more query text segments comprises a portion of the text template with an updated modifiable template section.

8. The computer-implemented method of claim 6, wherein the one or more population instructions restrict the one or more modifiable template sections to complementary data relative to a plurality of structured data entries associated with the predictive task.

9. The computer-implemented method of claim 6, wherein the one or more population instructions comprise one or more automated queries to one or more domain-specific data sources.

10. The computer-implemented method of claim 1, wherein generating the plurality of task-specific similarity scores for the plurality of text segments comprises:

generating a first similarity score for a text segment based on a comparison between a text segment embedding corresponding to the text segment and a first prompt embedding of the one or more prompt embeddings;

generating a second similarity score for the text segment based on a comparison between the text segment embedding and a second prompt embedding of the one or more prompt embeddings;

generating a first ranked list based on a comparison between the first similarity score for the text segment and a plurality of first similarity scores for the plurality of text segments; and generating a second ranked list based on a comparison between the second similarity score for the text segment and a plurality of second similarity scores for the plurality of text segments.

11. The computer-implemented method of claim 10, wherein the first prompt embedding is associated with a first significance weight and the second prompt embedding is associated with a second significance weight and identifying the set of task-specific text segments comprises:

identifying a first subset of the set of task-specific text segments from the first ranked list based on the first significance weight and a threshold evidence limit;

identifying a second subset of the set of task-specific text segments from the second ranked list based on the second significance weight and the threshold evidence limit; and removing one or more duplicate task-specific text segments from the set of task-specific text segments.

12. The computer-implemented method of claim 1, wherein the set of task-specific text segments are associated with a training entity and training the target machine learning model comprises:

receiving one or more structured data entries associated with the training entity;

generating a multi-modal training entry by merging the one or more structured data entries with the set of task-specific text segments;

inputting the multi-modal training entry to the target machine learning model to receive a training output; and updating one or more parameters of the target machine learning model based on a comparison between the training output and a training label.

13. A system comprising memory and one or more processors communicatively coupled to the memory, the one or more processors configured to:

generate, using a domain-specific language model, a plurality of text segment embeddings for a plurality of text segments of a plurality of input text documents associated with a predictive task;

identify one or more prompt embeddings associated with the predictive task;

generate a plurality of task-specific similarity scores for the plurality of text segments based on a comparison between the plurality of text segment embeddings and the one or more prompt embeddings;

identify a set of task-specific text segments from the plurality of text segments based on the plurality of task-specific similarity scores; and train a target machine learning model based on the set of task-specific text segments.

14. The system of claim 13, wherein the one or more processors are further configured to:

identify an input document threshold based on a distribution of documents for a plurality of entities associated with an enterprise; and receive the plurality of input text documents from an enterprise data source based on the input document threshold.

15. The system of claim 13, wherein the plurality of input text documents is respectively associated with a plurality of recordation times and generating the plurality of text segment embeddings comprises:

generating an input document sequence by sequentially concatenating the plurality of input text documents based on the plurality of recordation times; and inputting the input document sequence to the domain-specific language model to generate the plurality of text segment embeddings.

16. The system of claim 13, wherein the one or more prompt embeddings are identified from a plurality of prompt embeddings respectively associated with a plurality of predictive tasks.

17. The system of claim 13, wherein the one or more prompt embeddings are generated, using the domain-specific language model, based on one or more query text segments from a populated query template.

18. The system of claim 17, wherein the populated query template comprises a text template with one or more modifiable template sections and one or more population instructions configured to modify the one or more modifiable template sections based on the predictive task.

19. The system of claim 18, wherein a query text segment of the one or more query text segments comprises a portion of the text template with an updated modifiable template section.

20. One or more non-transitory computer-readable storage media including instructions that, when executed by one or more processors, cause the one or more processors to:

generate, using a domain-specific language model, a plurality of text segment embeddings for a plurality of text segments of a plurality of input text documents associated with a predictive task;

identify one or more prompt embeddings associated with the predictive task;

generate a plurality of task-specific similarity scores for the plurality of text segments based on a comparison between the plurality of text segment embeddings and the one or more prompt embeddings;

identify a set of task-specific text segments from the plurality of text segments based on the plurality of task-specific similarity scores; and train a target machine learning model based on the set of task-specific text segments.

* * * * *